(12) United States Patent
Cohen et al.

(10) Patent No.: US 6,404,861 B1
(45) Date of Patent: Jun. 11, 2002

(54) DSL MODEM WITH MANAGEMENT CAPABILITY

(75) Inventors: Michael S. Cohen, Enola, PA (US); K. C. Babu, Bangalore (IN); R. Balasubramanyam, Bangalore (IN); Murali Ramanathan, Bangalore (IN); P.K. Nanda Kumar, Bangalore (IN)

(73) Assignee: e-Cell Technologies, Austin, TX (US)

( * ) Notice: Subject to any disclaimer, the term of this patent is extended or adjusted under 35 U.S.C. 154(b) by 0 days.

(21) Appl. No.: 09/547,911

(22) Filed: Apr. 11, 2000

Related U.S. Application Data

(60) Provisional application No. 60/161,420, filed on Oct. 25, 1999.

(51) Int. Cl.[7] .............................................. H04M 11/00
(52) U.S. Cl. .............................. 379/93.01; 379/90.01; 379/93.28
(58) Field of Search ............................ 379/90.1, 93.01, 379/93.05, 93.06, 93.07, 93.08, 93.28, 93.29, 93.31, 93.32; 370/352, 445, 484, 487

(56) References Cited

U.S. PATENT DOCUMENTS

| | | |
|---|---|---|
| RE31,182 E | 3/1983 | Crager et al. |
| 5,014,315 A | 5/1991 | Polyak et al. |
| 5,033,062 A | 7/1991 | Morrow et al. |
| 5,226,120 A | 7/1993 | Brown et al. |
| 5,367,563 A | 11/1994 | Sainton |
| 5,515,423 A | 5/1996 | Beck, et al. |
| 5,541,919 A | 7/1996 | Yong, et al. |
| 5,606,664 A | 2/1997 | Brown et al. |
| 5,657,314 A | 8/1997 | McClure et al. |
| 5,688,857 A | 9/1997 | McHale |
| 5,756,280 A | 5/1998 | Soora et al. |
| 5,781,617 A | 7/1998 | McHale et al. |
| 5,790,548 A | 8/1998 | Sustanizadeh et al. |
| 5,812,786 A | 9/1998 | Seasholtz et al. |
| 5,852,655 A | 12/1998 | McHale et al. |
| 5,889,776 A | 3/1999 | Liang |
| 5,889,841 A | 3/1999 | Shin |
| 5,898,761 A | 4/1999 | McHale et al. |
| 5,901,205 A | 5/1999 | Smith et al. |
| 5,905,781 A | 8/1999 | McHale et al. |
| 5,936,963 A | 8/1999 | Saussy |
| 5,987,061 A | 11/1999 | Chen |
| 6,002,722 A | 12/1999 | Wu |
| 6,014,431 A | 1/2000 | McHale et al. |
| 6,049,826 A | 4/2000 | Beser |
| 6,055,268 A | 5/2000 | Timm et al. |
| 6,058,421 A | 5/2000 | Fijolek et al. |
| 6,061,357 A | 5/2000 | Olshansky et al. |
| 6,065,049 A | 5/2000 | Beser et al. |
| 6,070,246 A | 5/2000 | Beser |
| 6,088,730 A | 7/2000 | McHale |
| 6,188,669 B1 * | 2/2001 | Bellenger .................... 370/230 |
| 6,246,679 B1 * | 6/2001 | Yamamoto ................... 370/352 |

* cited by examiner

*Primary Examiner*—Stella Woo
*Assistant Examiner*—Melur Ramakrishnaiah
(74) *Attorney, Agent, or Firm*—McDermott, Will & Emery

(57) ABSTRACT

A modem using digital subscriber line (DSL) provides high speed access over a copper plant. The DSL modem exchanges management information to a terminating multiplexer using a proprietary protocol, thus enabling reliable, fast access to networking resources.

13 Claims, 14 Drawing Sheets

DSL MODEM WITH MANAGEMENT CAPABILITY

This application claims the benefit of U.S. Provisional Application No. 60/161,420, filed Oct. 25, 1999, which is fully incorporated herein by reference.

BACKGROUND OF THE INVENTION

1. Technical Field

The present invention relates to a system which provides access to a high-speed connection. In particular, the present invention is directed to a modem using digital subscriber line (DSL) technology to facilitate the transfer of voice and data.

2. Background Art

As the information age matures, it is enabled by a number of technological advances, such as the geometric growth of networked computing power and the prevalence of reliable and ubiquitous transmission media. Today's consumers in both the residential and business arena have been acclimated to a more graphical approach to communication. In particular, multimedia applications (which include textual, graphical, image, video, voice and audio information) have become increasingly popular and find usage in science, business, and entertainment. Local area networks (LANs) are essential to the productivity of the modern workplace; Ethernet-type networks have dominated the LAN market and have been continually enhanced (e.g., switched Ethernet, Fast Ethernet, and/or Gigabit Ethernet) to keep pace with the bandwidth intensive multimedia applications.

A compelling example of the growth of information consumption is the dramatic increase in users of the World Wide Web, a multimedia-based information service provided via the Internet. Although initially a forum for academia to exchange ideas captured in ASCII text, the Internet has developed to become a global media for users from all walks of life. These Internet users regularly exchange multimedia graphical, image, video, voice and audio information as well as text.

Furthermore, the business world has come to realize tremendous value in encouraging workers to telecommute. To avoid the idle commuting time, today's workers enjoy the convenience of working from home via their personal computers. As illustrated in Figure, a user at a remote site 101 (e.g., home) has traditionally been able to access her/his office 119, which includes accessing an office local area network 119b (LAN), through a dial-up connection over a 33 Kbps or 56 Kbps modem 101b. The dial-up connection is handled by a telephone central office (CO) 105 through a voice switch 107, which switches the "data" call through a public switched telephone network (PSTN) 111. The data call terminates in a remote CO 121 at a voice switch 123. The voice switch 123 switches the call to the subscriber; in this case, the called line is associated with a modem in a modem pool 119a. Once connected to the modem pool 119a, the end user at her/his remote site 101 can access the computing resources in his office 119. These sources include a multimedia server 119c and a PC 119d of the remote user. A similar connection to Internet 115 by a user at a remote site 101 can be accomplished by connecting to an Internet Service Provider (ISP) 117 instead of modem pool 119c.

Unfortunately, telecommuting from a remote office or accessing multimedia information from home over the Internet imposes an enormous strain on networking resources. It is common knowledge that the networking infrastructure is the bottleneck to the expedient transfer of information, especially bandwidth intensive multimedia data. As alluded to before, today's access methods are limited to standard analog modems, such as 101b, which have a maximum throughput of 56 Kbps on a clean line (i.e., a line not having any appreciable noise causing errors in bit rate transfer). Remote users may alternatively acquire basic rate (2B+D) Integrated Services Digital Network (ISDN) services at 128 kbps. Even at this speed, telecommuters may quickly grow impatient with slow response times as compared to the throughput of their LANs to which they have grown accustomed. On average, a typical Ethernet user can expect to achieve approximately 1 Mbps on a shared 10Base-T Ethernet LAN and up to 9+ Mbps in a full duplex switched Ethernet environment. In addition, Internet users are also demanding greater access speeds to cope with the various multimedia applications that are continually being developed. Fortunately, the communication industry has recognized the escalating demand.

Cell switching technology, such as Asynchronous Transfer Mode (ATM), was developed in part because of the need to provide a high-speed backbone network for the transport of various types of traffic, including voice, data, image, and video. An ATM network 113 is typically able to provide bandwidths to an ATM user at approximately 1.5 Mbps on a T1 line, 44.7 Mbps on a T3 line, and 155 Mbps over a fiber optic OC-3c line. Consequently, ATM networks are suitable to transport multimedia information.

ATM further provides a mechanism for establishing quality of service (QoS) classes during the virtual channel setup, thereby allotting a predetermined amount of bandwidth to the channel. QoS classes define five broad categories that are outlined, for example, by the ATM Forum's UNI 3.0/3.1 specification. Class 1 specifies performance requirements and indicates that ATM's quality of service should be comparable with the service offered by standard digital connections. Class 2 specifies necessary service levels for packetized video and voice. Class 3 defines requirements for interoperability with other connection-oriented protocols, particularly frame relay. Class 4 specifies interoperability requirements for connectionless protocols, including IP, IPX, and SMDS. Class 5 is effectively a "best effort" attempt at delivery; it is intended for applications that do not require guarantees of service quality.

In conventional data networks, such as the typical Ethernet LAN or X.25 WAN, there are no explicit negotiations between the network and the user specifying the traffic profile and quality of service expected. Rather, the network is expected to provide each user with a "fair share" of the available bandwidth.

However, in an ATM network, fair allocation of bandwidth requires users to adjust their transmission rates according to the feedback from the network. ATM networks carry fixed bandwidth services required for multimedia applications (constant bit rate (CBR) traffic) and guaranteed bandwidth services for high-priority data applications (variable bit rate (VBR) traffic). The remaining bandwidth, not used by guaranteed bandwidth services, must be shared fairly across all users. The ATM Forum refers to services that make use of this otherwise idle bandwidth as available bit rate (ABR) services.

Although these ABR applications must contend for remaining available bandwidth and would not provide specific throughput guarantees, ABR applications still would require fair access to the available bandwidth with a minimum of cell loss. If ABR traffic had no mechanism to determine if sufficient bandwidth were available to handle the transmission on the network and traffic was simply fed in, network congestion might result in dropped cells, and application traffic might be lost. ABR flow control is an ATM layer service category for which the limiting ATM layer transfer characteristics provided by the network may change after establishing the network connection. A flow control mechanism is specified which supports several types of feedback to control the source rate in response to changing ATM layer transfer characteristics. When the network becomes congested, the end-stations outputting ABR traffic are instructed to reduce their output rate. It is expected that an end-system that adapts its traffic in accordance with the feedback will experience a low cell loss ratio and obtains a fair share of the available bandwidth according to a network-specific allocation policy. Cell delay variation is not controlled in this service, although admitted cells are not delayed unnecessarily.

In this end-to-end rate-based scheme, the source (e.g., a user remote site 103) of a virtual circuit (VC) indicates the desired rate in a resource management cell (RM cell). An RM cell is a standard 53-byte ATM cell used to transmit flow-control information. The RM cell travels on the VC about which it carries information, and is therefore allowed to flow all the way to the destination end-station (e.g., PC 119d). The destination reflects the RM cell, with an indicator to show that the RM cell is now making progress in the reverse direction. The intermediate switches (e.g., switch 109) then identify within the reverse RM cell their respective maximum rates (the explicit rate allocated to the VC). After the source receives the reverse RM cell, the smallest rate identified in the reverse RM cell is then used for subsequent transmissions until a new reverse RM cell is received.

ATM has many recognized advantages and has dominated wide area networks (WANs) as the preferred backbone transport technology. Because of cost and performance factors, ATM faces stiff competition from both switched and shared-media high-speed LAN technologies, including Ethernet, Fast Ethernet, and Gigabit Ethernet. And although ATM typically offers QoS guarantees superior to the prioritization schemes of competing high-speed technologies, many users remain unable to take advantage of these features. If a remote user wishes to obtain the advantages of ATM, one solution would be to acquire an ATM switch on the premises as shown in Figure A. The remote site 103 would need to be equipped with an ATM switch 103a, whereby a PC 103b interfaces the ATM switch 103a via an ATM NIC 103c. In addition, the remote user would have to lease a T1 line or an OC-3c pipe from the Telco. The leased line would terminate in an ATM switch 109 in the CO 105. The CO ATM switch 109 is connected to the ATM network 113. With an ATM connection, the remote user may quickly access multimedia information on the Internet by establishing a virtual channel that would terminate at ATM switch 125 in CO 121. The CO 121 would of course have some means of communication with the ISP 117; typically routers (not shown) are used.

Alternatively, Figure B illustrates an ATM to the desktop solution whereby the xDSL technology is utilized to extend ATM capability remotely. At the customer premises 103, a PC 103b is equipped with an ATM NIC 103c, which is attached to an xDSL modem 103d. In addition, a telephone set 103e is linked to the xDSL modem 103d. The xDSL modem is connected over twisted pair copper wire to the CO 105, terminating at the POTS splitter 117. The POTS splitter 117 separates the data signals originating from the PC 103b from the voice signals. A xDSL multiplexer (mux) 115 receives the data signals from the POTS splitter and uplinks these signals to the ATM switch 105. Although the solution present above provides a way to deliver ATM capabilities to the desktop, it disadvantageously requires the acquisition of ATM NICs by the remote users, and the xDSL modem has to have a costlier ATM interface.

Despite all the many inherent advantages with ATM, Ethernet-type LANs constitute nearly all of the networking resources of business and residential users. Moreover, these legacy systems are still being enhanced and marketed, e.g., switched Ethernet, switched Fast Ethernet, and switched Gigabit Ethernet are significantly lower cost than their ATM counterparts. ATM technology requires a substantial investment in infrastructure, from cable plant to switches to network interface cards (NICs). This tremendous investment cost can be sustained in the wide area network (WAN) where costs can be spread out. However, in the LAN environment, the investment in infrastructure is typically unsustainable which translates into retention of "legacy" LANs such as Ethernet.

While a number of service providers (e.g., Telcos) employ ATM to establish point-to-point circuits, little has been done to utilize ATM for transporting multimedia information or services to the desktop. This is simply not commercially practical. As previously noted, commercial practicality prohibits such an endeavor. In essence, millions of users would be required to purchase expensive ATM network interface cards, and then possibly add very costly T1, T3, or OC-3c lines. As a result, service providers have not commercially implemented ATM in the delivery of multimedia information to the desktop.

A primary disadvantage is the inadequate bandwidth supplied to the current subscribers, especially for the transmission of multimedia information, resulting in unacceptable response times.

DISCLOSURE OF THE INVENTION

There is a need for an arrangement that enables the high-speed transmission of multimedia information to the desktop.

There is also a need for an arrangement that provides management capabilities associated with the network access device to improve reliability.

These and other needs are attained by the present invention, where a digital subscriber line modem provides user access to a high speed link to networking resources. The DSL modem communicates management information to a terminating multiplexer using a proprietary protocol.

According to one aspect of the present invention, an access device for providing high speed network connectivity, comprises a main processor for executing code to send and receive proprietary protocol packets for communicating management information with a multiplexer using a digital subscriber line (DSL) technology. The management information indicates presence of an Ethernet-type port, current line speed, and media access control (MAC) address. A modem interface bus is coupled to the main processor for providing read/write control signs. A multifunction controller is coupled to the main processor for performing Ethernet media access control (MAC). An Ethernet interface is coupled to the multifunction controller for communicating with an external Ethernet device. A DSL port is coupled to the modem interface bus for receiving and transmitting a DSL signals. A DSL bit pump is coupled to the modem interface for performing digital signal processing functions. A digital/analog converter (DAC) is coupled to the DSL bit pump for outputting signals to the DSL bit pump for transport over the DSL port and over the Ethernet interface.

Another aspect of the present invention provides An access device for providing high speed network connectivity, comprises a central processing unit (CPU) card comprising a main processor configured for supplying management information with a multiplexer over a digital subscriber line (DSL); the management information indicating presence of an Ethernet-type port, current line speed, and media access control (MAC) address. A multi-function controller is coupled to the main processor for configured for performing Ethernet media access control (MAC). A modem interface bus is coupled to the main processor configured for providing read/write control signs. A DSL port is coupled to the modem interface bus for receiving and transmitting a DSL signals. A modem card is coupled to the CPU card for interfacing a public switched telephone network (PSTN), which comprises a DSL bit pump coupled to the modem interface of the CPU card configured for performing digital signal processing functions, and a digital/analog converter (DAC) coupled to the DSL bit pump for outputting signals to the DSL bit pump for transport over the DSL port and over the Ethernet interface.

Additional advantages and novel features of the invention will be set forth in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The present invention retains the traditional low cost and low complexity Ethernet NIC but achieves ATM capability over Ethernet through use of an Ethernet switch which employs a multi-processor architecture to interface an Ethernet environment with an ATM infrastructure.

Figure 1A:
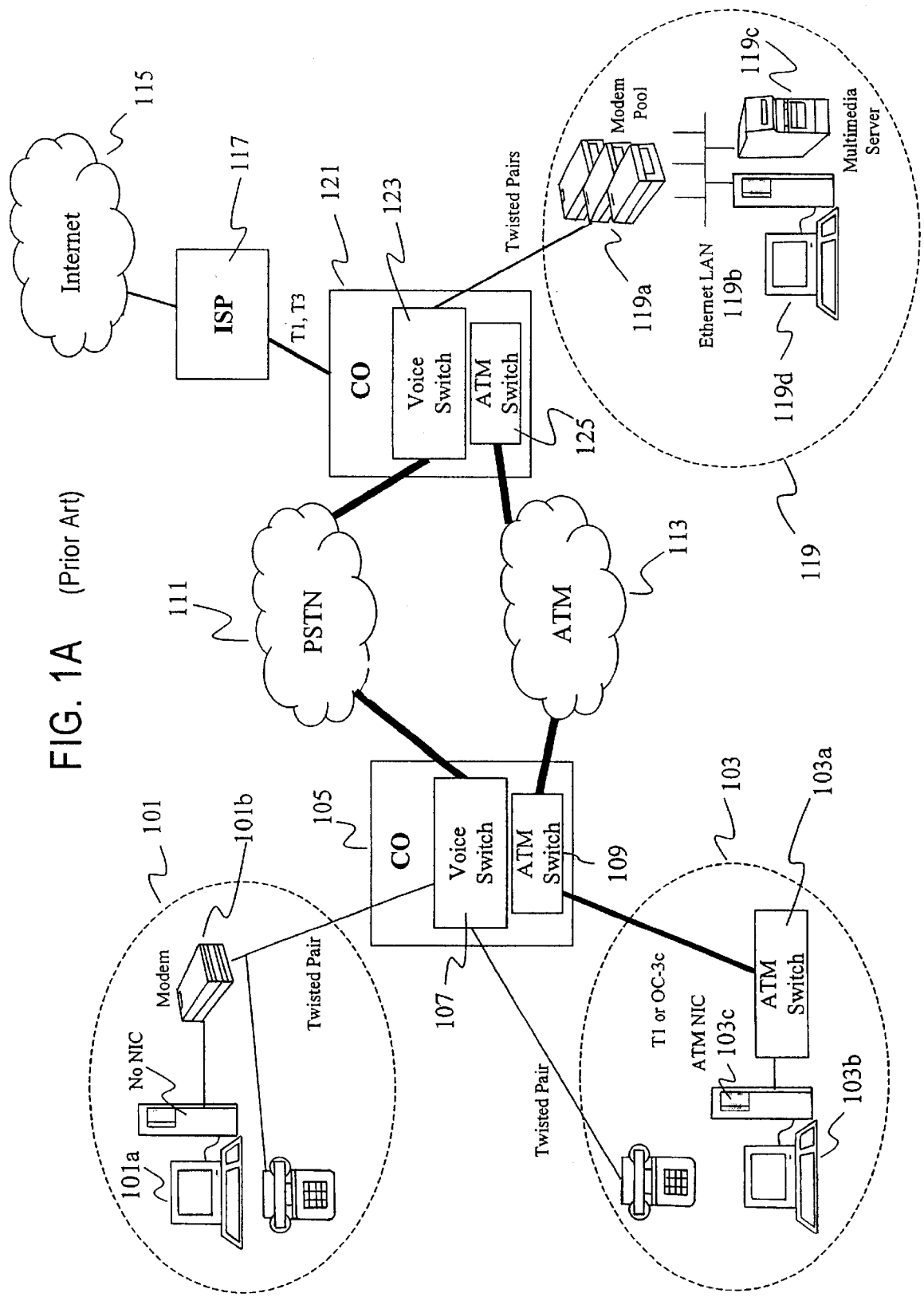
FIGS. 1A and 1B are graphic representations of a prior art networks and the access methods.
Figure 1B:
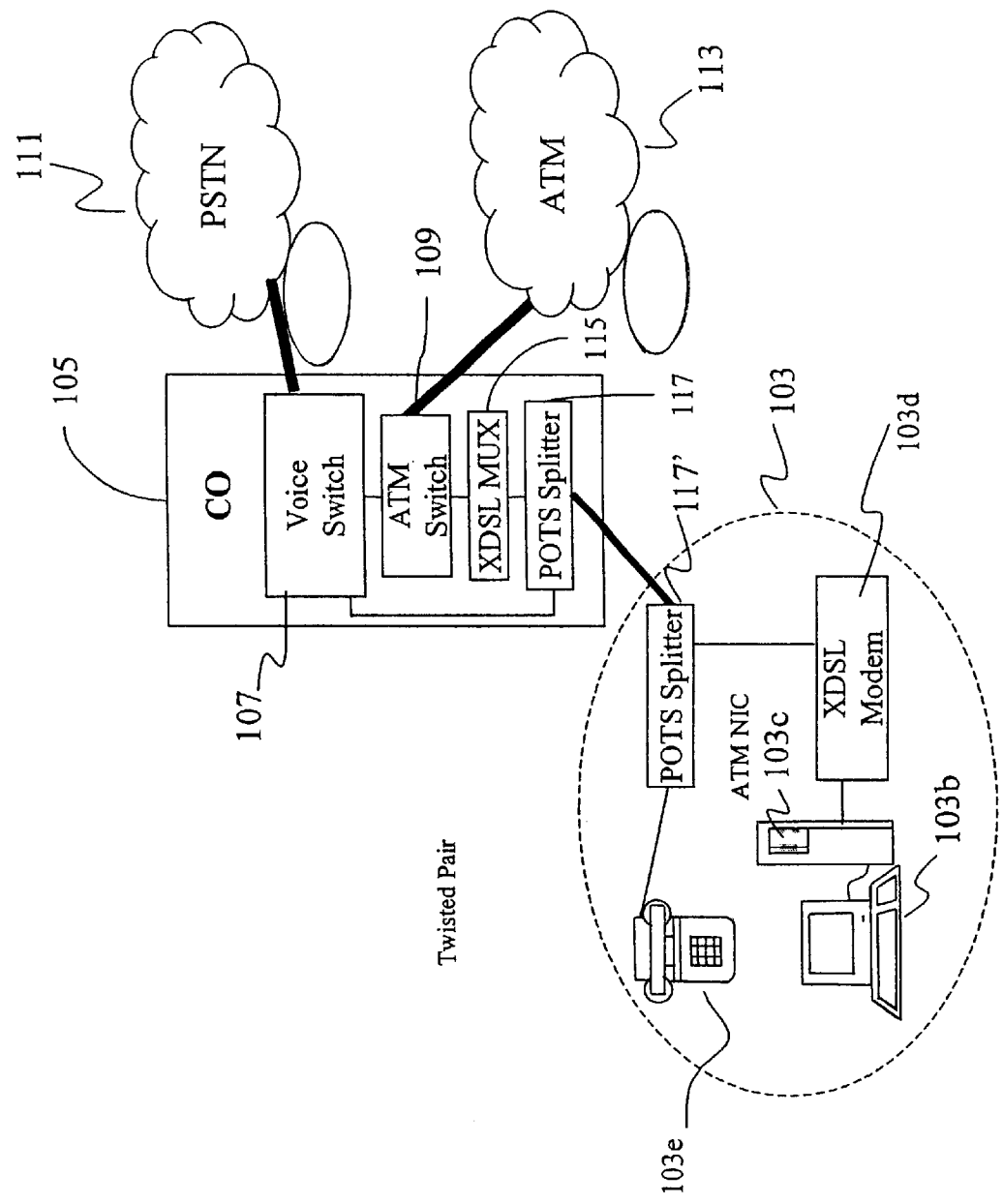
Figure 2A:
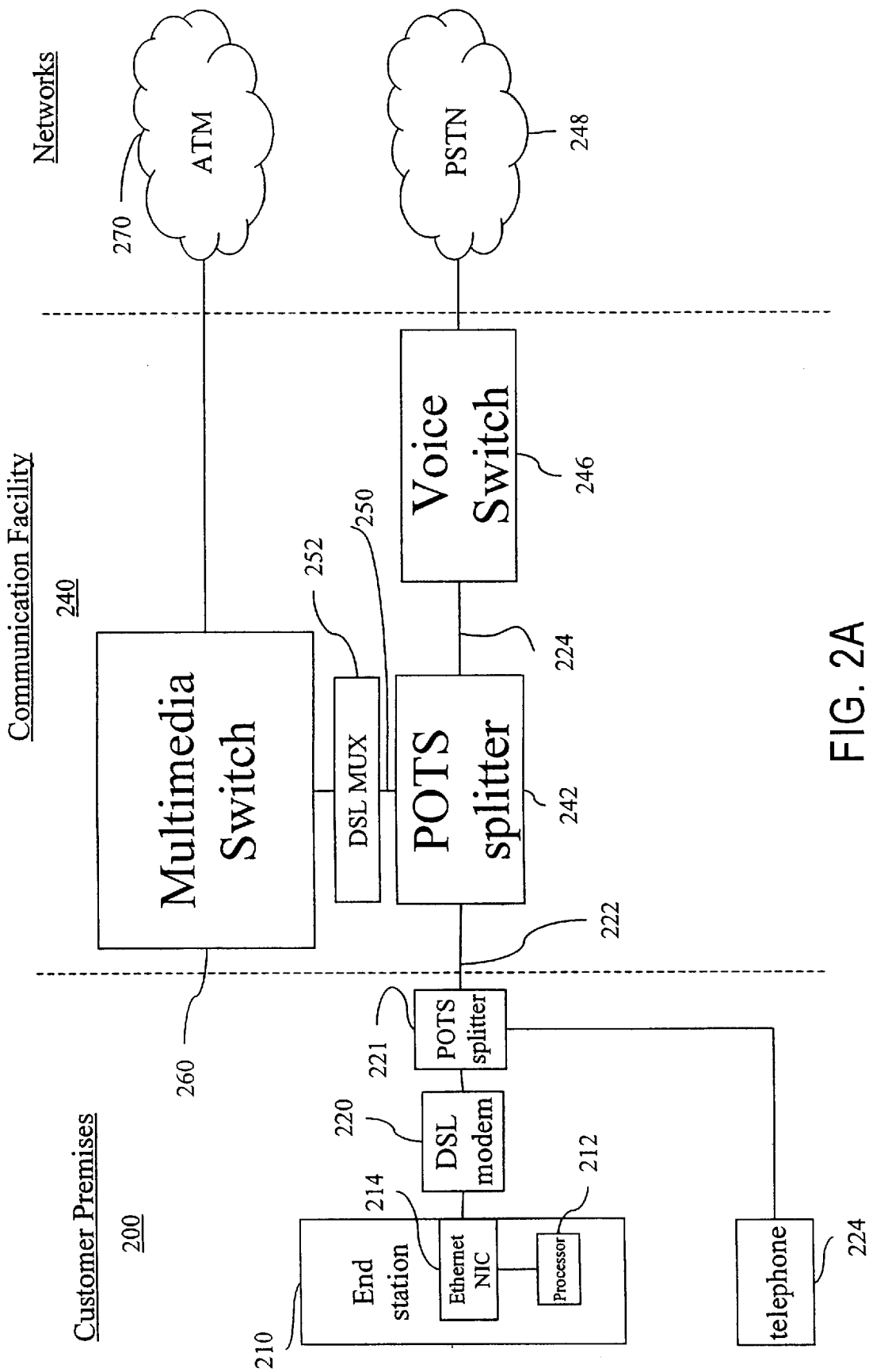
FIGS. 2A and 2B are block diagrams depicting detailed aspects of the DSL system configured in accordance with the present invention.

FIG. 2A illustrates an embodiment of the present invention taking advantage of the existing network media created by the telephone industry which implemented a vast network of copper twisted pair wiring to interconnect homes and businesses domestically and abroad. In FIG. 2A, a customer premises 200 is shown as comprising an end-station 210, such as a desktop computer residing in a home or business. Typically, such end-stations are either stand-alone desktop stations, or are already connected to a collocated local area network (LAN).

A variety of LAN technologies exist, but the large majority of LANs conform to the IEEE standard 802.3, which defines Ethernet standards. Various types of Ethernet systems exist such as switched Ethernet, Fast Ethernet, and Gigabit Ethernet. The end-station 210 is equipped with an Ethernet NIC 212 residing in a personal computer with a host processor 214. Ethernet NIC 214 is connected to a high-speed digital subscriber line (DSL) modem 220, which interfaces with a telephone line 222 via a CP (customer premise) POTS (plain old telephone service) splitter 221. The telephone line is a twisted pair copper wire, which the conventional customer premises telephone 224 uses to connect with a telephone communication facility 240. A telephone communication facility 240 or end office is shown in FIG. 2A as a communications facility 240; however, any communication facility can be used (e.g., a wire closet in a separate building).

High-speed communication to remote users depends largely on the method of access to the networking infrastructure. Most users cannot bear the cost of leasing expensive outside lines that are needed to provide high speed communication to the Internet or to their offices. The disclosed embodiment overcomes this dilemma by employing a high-speed, low cost subscriber interface that takes advantage of the legacy outside cable plant, such as standard twisted copper pair wiring and coaxial cables.

One embodiment, shown in FIG. 2A, utilizes digital subscriber line (DSL) technology to delivery the high bandwidth that the remote users demand. Because traditional copper cabling is used, the remote users do not have to upgrade their current physical connection—their POTS line is sufficient. Because the outside plant need not be revamped, telephone companies (Telcos) can readily implement DSL services. The DSL modem 220 acts as the network access device to the communication facility 240. A DSL multiplexer 252 provides termination of the DSL modem connection within communications facility 240. DSL technology is categorized by the downstream and upstream bandwidths. The present invention could be applied to any of the various forms of DSL technology. One variety, commonly employed, Rate Adaptive DSL or RADSL, involves a rate negotiation between the customer premise DSL modem 220 and the Telco CO modem located within DSL MUX 252 which takes into account distance and line quality issues yielding the maximum available rate for the line conditions encountered. RADSL supports both Asymmetric DSL or ADSL, with a maximum downstream rate of 7.62 Mbps and a maximum upstream rate of 1.1 Mbps, which is ideal for very high speed Internet access and video-on-demand applications. ADSL services can be delivered up to 18,000 feet from the communication facility 240 over a single copper twisted pair. RADSL also supports Symmetric DSL or SDSL, with a maximum bi-directional rate of about 1.1 Mbps, which is ideal for very high quality video-conferencing and remote LAN access. Another type of DSL technology is known as high-bit-rate digital subscriber line (HDSL), which provides a symmetric channel, delivering T1 rates (1.544 Mbps) in both directions. HDSL has a distance limitation of about 12,000 feet without repeaters. Telcos have traditionally used HDSL to provide local access to T1 services. HDSL is already widely deployed within the Telco market as a low cost T-1 replacement. VDSL or Very high bit-rate DSL requires a fiber-to-the curb local loop infrastructure, with asymmetric speeds up to 52 Mbps. Other flavors of DSL (i.e., sometimes generically denoted xDSL) are characterized by whether the service is asymmetric or symmetric and the bandwidth allocations for the upstream and downstream transmissions.

The communication facility 240 comprises a plain old telephone service (POTS) splitter 242 which receives the information transmitted across the twisted pair line 222 and "splits" the low frequencies, which carry voice signals, from the high frequencies, which carry data signals. Essentially, the POTS splitter is a passband filter, whereby the low frequency information is carried by a voice line 224 to a voice switch 246 and ultimately to a public switched telephone network (PSTN) 248. The voice line 224, voice switch 246 and PSTN 248 are each conventional, and are therefore not explained further so as not to detract from the focus of the disclosure of the present invention.

The data information, which is modulated using high frequency signals, is transmitted over a twisted pair cable 250 to a POTS splitter 242. The POTS splitter 242 then passes the high frequency signals to a DSL multiplexer (DSL MUX) 252. The DSL MUX serves as the DSL modem termination point for numerous end users with DSL modems. The DSL MUX 252 aggregates all the DSL traffic and passes the multimedia information to the multimedia switch 260. The traffic can be of any data type including multimedia graphics, video, image, audio, and text. Various embodiments of the DSL MUX 252 can be employed, ranging from 24 line stackable modules through the traditional high density chassis based approach. Various line codes can be supported within the DSL modems, including Carrierless Amplitude Phase (CAP) modulation, Discrete Multi-Tone (DMT) modulation, Quadrature Amplitude Modulation (QAM), as well as others. Multimedia switch 260 is primarily an edge device that is connected to an ATM network 270 on which a conventional multimedia server (not shown) may be linked. The ATM network 270 thus represents a fast and efficient delivery system for multimedia applications to which the end user desires access. The multimedia switch 260 communicates with the CO DSL MUX 252 relative to traffic information, in order to minimize congestion. Traditionally, end user access to an ATM network has been through a router. Since the end-station 210 houses an Ethernet NIC 214, connection to ATM network 270 proves difficult without the system of the present invention, which allows information residing on an ATM network to be transferred to an Ethernet end-station while still retaining all the multimedia benefits of ATM, including QOS and ABR/ER flow control. An advantage associated with a DSL implementation is that the personal computer is constantly connected, much like a typical Ethernet LAN connection. That is, communication sessions are not initiated through a dial-up procedure.

Figure 2B:
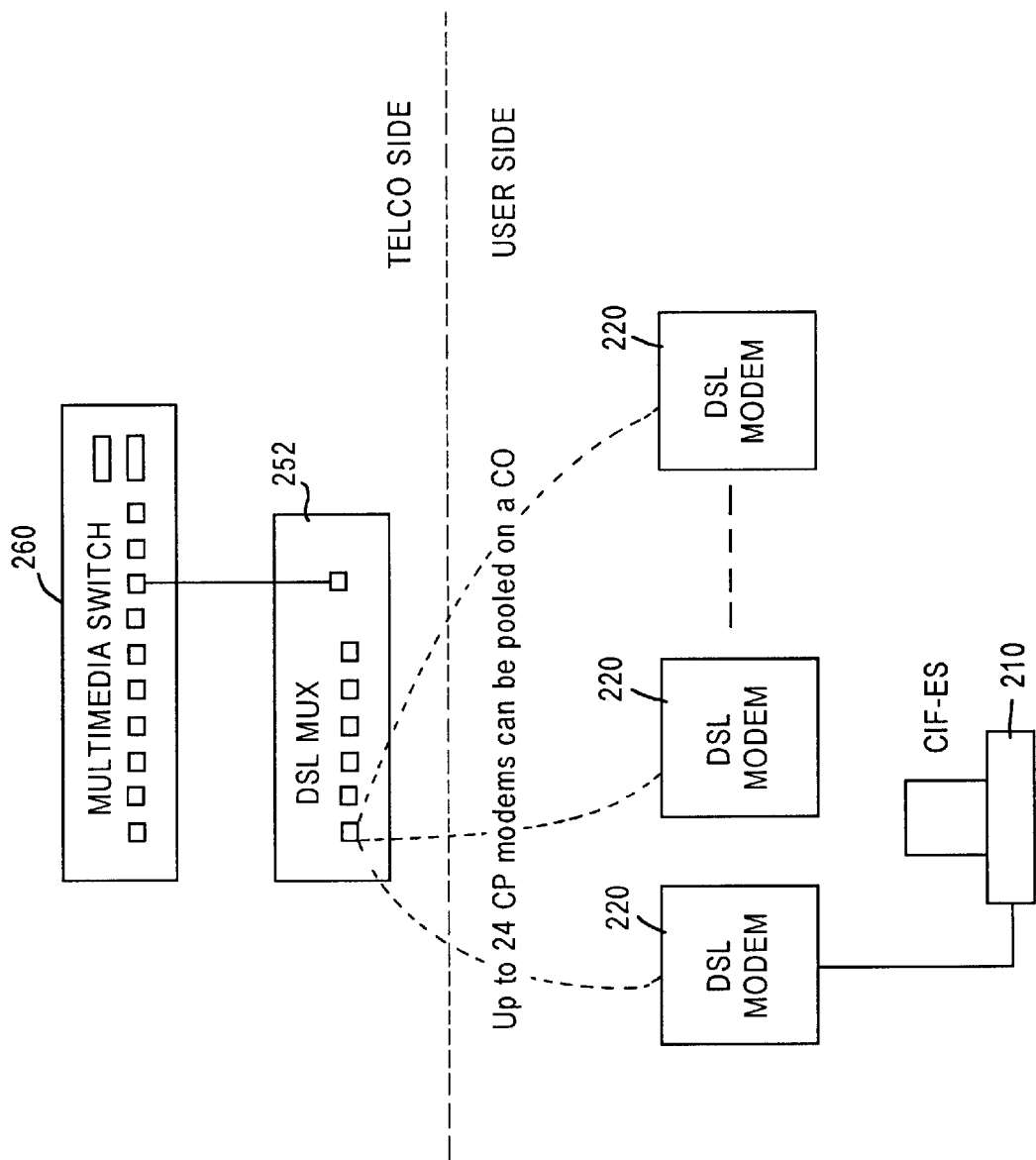

FIG. 2B is illustrates an other embodiment of the present invention where DSL Mux 252 is able to connect to a plurality of DSL modems 220. This configuration enables many customer premise modems 220, for example twenty four, to be pooled together. Further, the multimedia switch 260 can accommodate multiple DSL multiplexers 252, thereby achieving a higher density of subscribers. The uplink from the DSL multiplexer 252 to the multimedia switch 260 is typically a fast Ethernet connection.

Figure 3:
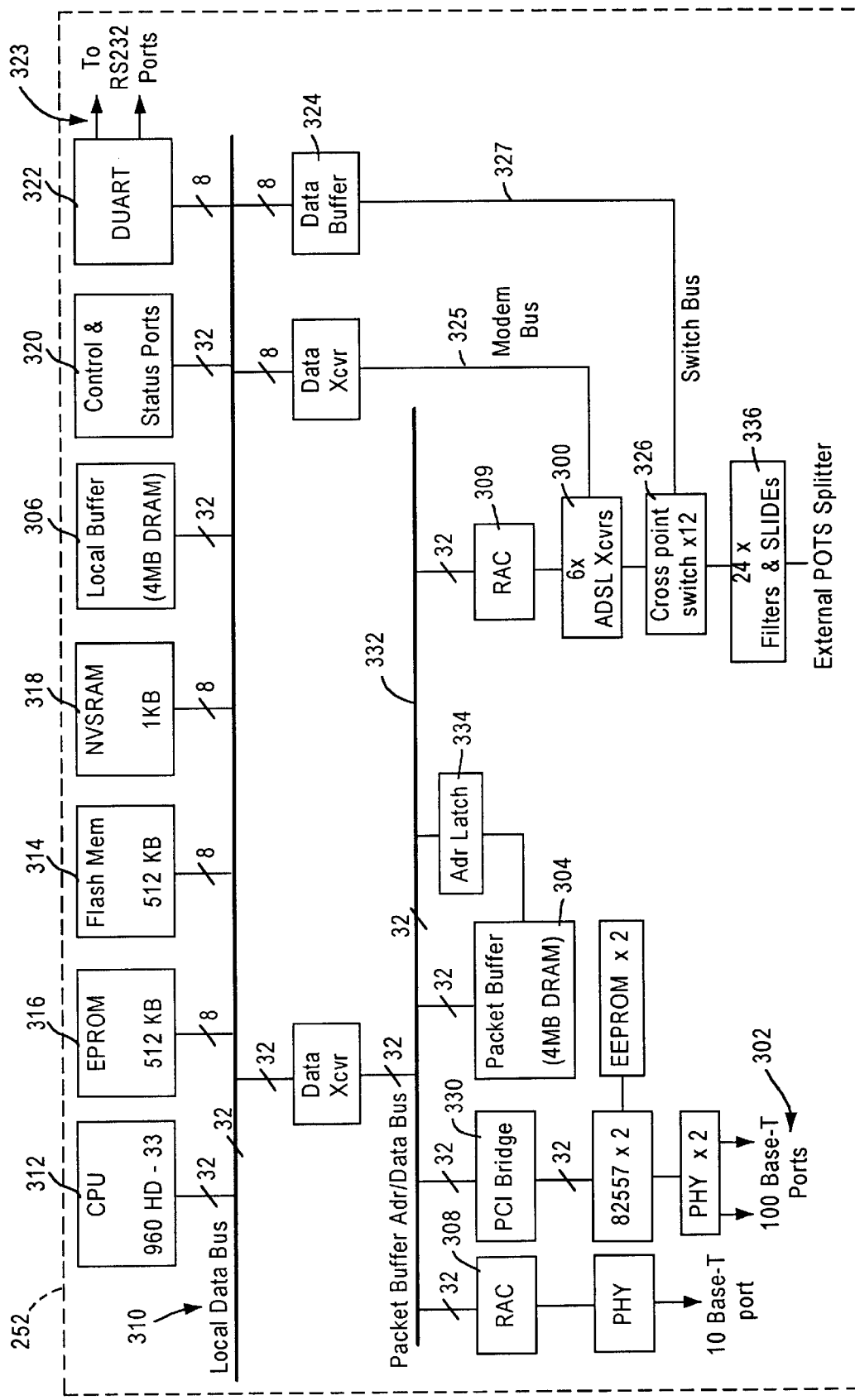
FIG. 3 is a block diagram of the hardware architecture of a DSL multiplexer in accord with one embodiment of the present invention.

Turning now to FIG. 3, DSL multiplexer 252 comprises a number of an ADSL modem devices based on CAP (Carrierless Amplitude/Phase) modulation technology, and is located within communication facility 240. The device will be used for Internet access and corporate private network use. DSL multiplexer 252 has 6 modems 300, which can be connected to 24 subscriber lines (SL) (e.g., 222) having customer premise modems, for example, DSL modem 220. DSL multiplexer 252 also has two 100Base-T ports 302 to communicate with multimedia switch 260. In such a configuration, multimedia switch 260 will have up to 24 end stations, such as end station 210, connected to one 100Base-T port. One or more of these end-stations can be CIF end stations. In order to deliver QoS to these end stations, some information has to be passed between DSL multiplexer 252 and multimedia switch 260. A specific protocol is defined for this purpose. DSL multiplexer 252 can implement, for example, the Intel 80960HD (i960HD) 32 bit RISC processor running at 33 MHz.

Two 100BaseT ports 302 operate as one primary port and one standby port. The standby port takes over the functions of the primary port when the primary port fails and vice versa. At any time, only one port will be active. 100BaseT port 302 is implemented in one embodiment using Intel's 82557 MAC and external transceivers. 100baseT port 302 supports fill duplex operation. Logic is provided to drive the "link/activity" and "port disabled" LEDS. The physical connector is a standard RJ45 jack.

Two DRAM based memory banks, i.e. a packet buffer 304 and a local buffer 306, are implemented in one embodiment. Packet buffer 304 is used for the DSL data and local buffer 306 is used as code memory and workspace. Fast page EDO (Extended Data Out) DRAMs are used in an embodiment for both memory banks, since they can work with zero wait states in a 33 Mhz system without having to introduce memory interleaving.

Remote access controller(RAC) 308 provides the MAC functions for the 10BaseT port used for SNMP traffic. This port can also be used as a high-speed debug port during software testing. External 10Base-T transceiver is provided. Logic is provided to drive the "link/activity" and "port disabled" LEDs. The physical connector is a standard 8 pin RJ45 jack. The RAC chip 308, for example the Galileo Technology (GT96010), is used to interface the ADSL serial data (to/from the GTI modem devices) to packet buffer 304. This chip has six multi-protocol serial channels and an Ethernet port. It has a DMA engine which is compatible with, for example, i960JX processor. Some glue logic is required to interface this chip to, for example, i960HD. Each GT96010 can currently support three ADSL channels at maximum downstream data rate of 8 Mbps and an upstream rate of 1 Mbps. The two 100baseT uplink ports 302 can be implemented using the Intel 82557 MAC chip. The 100baseT ports 302 support full duplex operation.

A local bus 310 will support a CPU 312, local DRAM 306, a flash memory 314, an EPROM 316, a NVSRAM (non-volatile static random access memory) 318, control ports and status ports 320, a DUART 322 and a set of buffers 324 which connects to the other buses. Flash memory 314 (512Kx8) is used for the storage of firmware. On power-up, the firmware will be downloaded from Flash 314 into local DRAM 306 (4 MB) for execution. The boot code resides in EPROM 316. DUART 322 provides (a) the PPP SNMP link (also used by a local diagnostic and configuration utility) and (b) a debug port which is used during the development cycle for testing and debugging the board. All modem transceivers 300 sit on an 8 bit wide modem bus 325. Crosspoint switches 326 sit on an 8 bit wide switch bus 327.

Packet buffer 304 (4 MB) is used to store the frames from the DSL multiplexer 252 interfaces (100BaseT and 10BaseT). The 100BaseT MAC chips can be a PCI device and can connect to packet buffer 304 through a PCI bridge 330. CPU 312 accesses the packet memory through buffer 304. Remote access controller (RAC) chip 308 is used to provide the 10BaseT interface for SNMP traffic. The six modem transceivers 300 are interfaced to the packet buffer 304 using two remote access controllers 309. All the above masters on a packet bus 332 operate with multiplexed address and data. A common address latch 334 is used to route the addresses to packet buffer 304. Arbitration among the contenders for packet buffer 304 is done in round robin fashion.

Two serial ports 323, operating at a maximum speed of 38.4 Kbps will be provided by using DUART chip 322. One serial port will be used for SNMP traffic over a PPP (point-to-point protocol) link. The same serial port can also be used for running the local DSL multiplexer 252 diagnostics utility. This port will also support a null modem connection (auto-answer only). The second serial port will be used only during development for debugging the card. The physical connector for each port is a 9 pin D-Sub receptacle.

The transceiver interface will be based on a RADSL chipset implemented as DSL modem 220. Six modem chipsets will be used to connect to 24 subscriber lines through a cross point switch. The GT96010, for example, multi-channel serial controllers will be used to interface the transceivers to packet buffer 304. Each controller provides three ADSL interfaces and a DMA engine supporting data bursts to the memory. DSL multiplexer 252 will use an external POTS splitter 242. One 50 pin champ connector will be used for the incoming DSL lines from POTS splitter 242.

The two control ports 320 use 32 bits, of which some bits are used as individual resets to the various controllers. 48 bits drive DSL status LEDs, 2 bits drive health/diagnostics LEDs, and 2 bits drive power-supply status LEDs. Three 8-bit ports control the power to line-drivers (SLIDES) 336. A fourth 8-bit port provides individual resets to modem transceivers 300. One 32-bit status port is provided to read in the status of the interrupt lines and of the power supply outputs. Another 8-bit port is used to read the interrupt status of modem transceivers 300.

DSL multiplexer 252 supports either (a) DC inputs (with internal DC-DC converters), for the Telco environment or (b) AC inputs (with internal SMPS for corporate environments. In the Telco case, dual redundant DC-DC converters and in the corporate case, dual redundant SMPSs will be mounted inside the unit. Each of these will provide 5V, 3.3V and ±15V with sufficient current to drive the electronics. The power supplies used will be having the protection diodes and the corresponding outputs will be shorted together. A faulty power supply can be without shutting down DSL multiplexer 252.

Since DSL multiplexer 252 is a store-and-forward device, data forwarding module 510 receives data on the ADSL modem lines which is multiplexed and sent over the 100 Mbps Ethernet port 302 (FIG. 3). The source MAC address of these packets are stored in an address table that pairs subscriber line number with MAC addresses. This address table will be needed when a frame is received over 100 Mbps Ethernet port 302 in order to perform data demultiplexing. The destination MAC address in the frame is used to index the table and identify the subscriber line to which the data has to be sent. The software in DSL multiplexer 252 comprises two components: Boot code and Runtime code. The Boot code resides in EPROM 316 and is invoked at power-on. It initializes the processor and executes the power-on diagnostics code. If fatal errors are seen, the boot code will blink the health LED and display the error code on the DSL status LEDs. and do nothing further. If the tests pass, and if Runtime code is present in the flash EPROM 314, the boot code will then decompress and move the runtime code from flash memory 314 to local memory 306 and transfer control to the runtime code. If the runtime code is not present in flash memory 314, the code is downloaded from a TFTP server either through the serial link, the 10Base-T link or through the 100Base-T link. The boot code also contains a debugger, configuration utility and diagnostic utility over the RS232 port.

Figure 4:
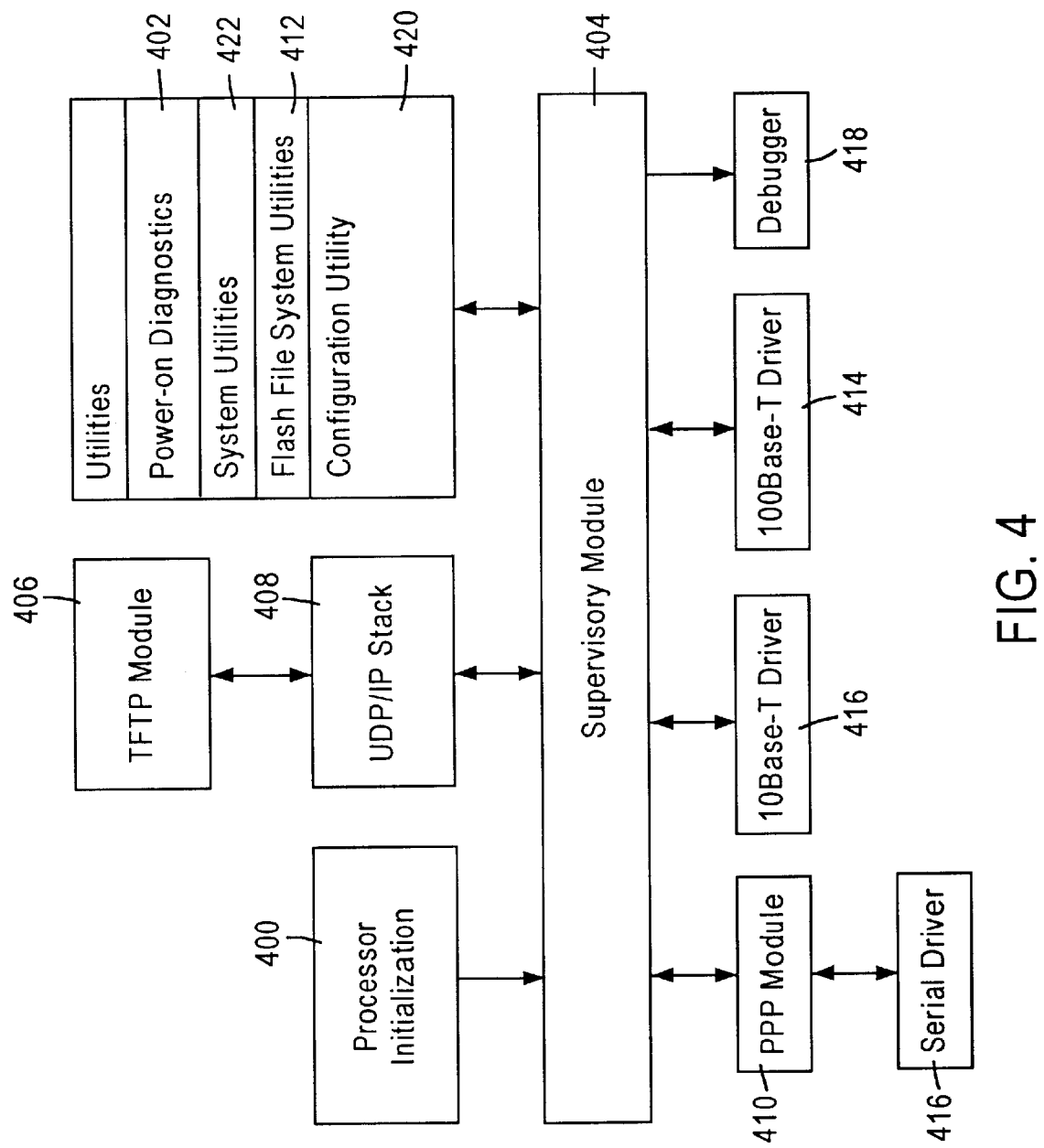
FIG. 4 is a diagram illustrating a boot code architecture of a component interfacing with the present invention.
Figure 5:
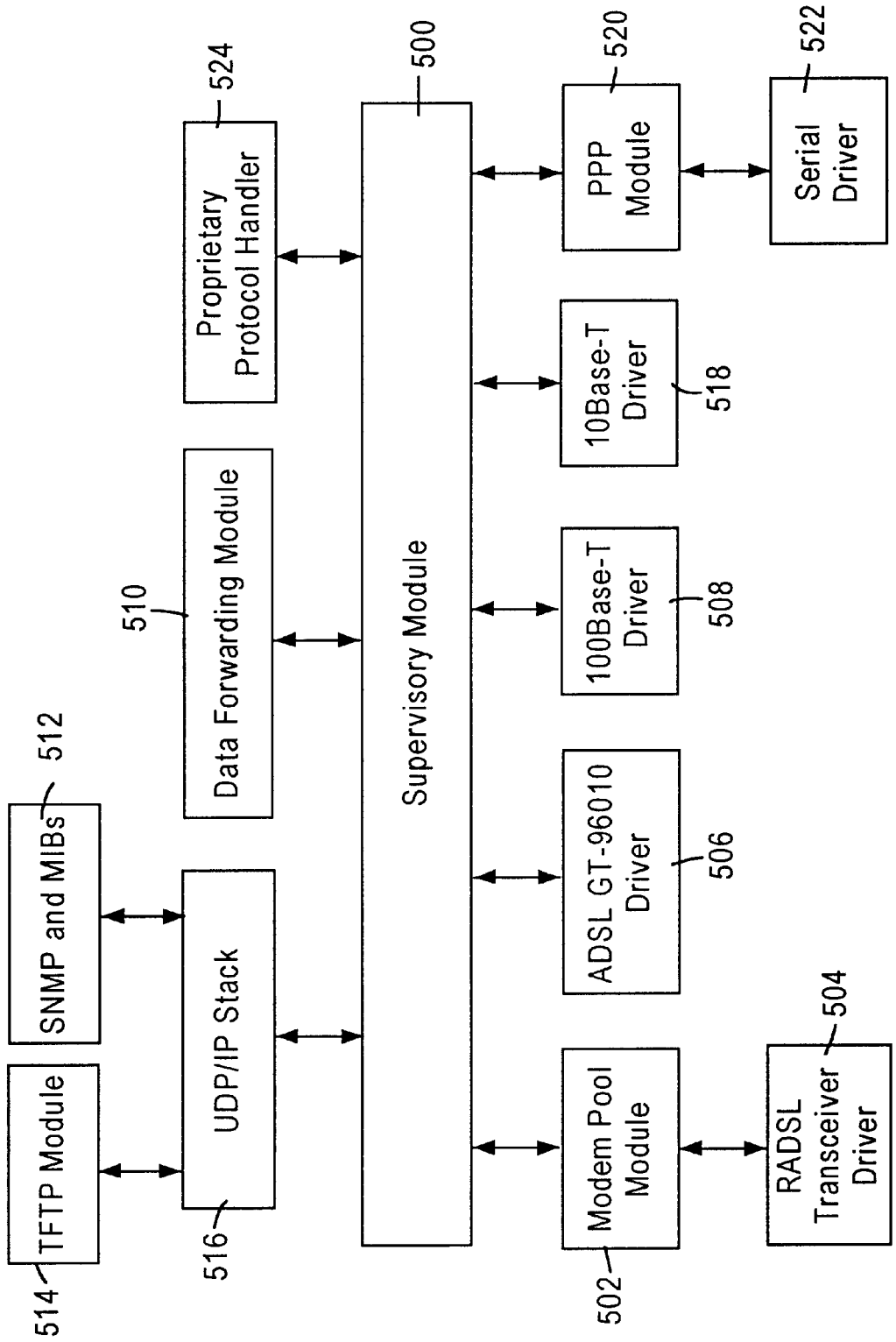
FIG. 5 is a diagram illustrating a runtime code architecture of a component interfacing with the present invention.

The architecture of the runtime code is shown in FIG. 5. A supervisory module 500 has an initialization module and a scheduler. The initialization module does all the startup initialization. The scheduler executes the different tasks defined in the software in a round-robin fashion. The main functions of the runtime code include: forwarding the data from the ADSL lines to 100Base-T port 302, demultiplexing and forwarding data from 100Base-T port 302 to the ADSL lines, controlling the operation of the modem transceivers 300, and sharing the modem transceivers 300 among the 24 subscriber lines. The Runtime code also includes a SNMPv2 based agent. The Boot code architecture is shown in FIG. 4. A processor initialization module 400 initializes the serial port, and the processor control structures on power-up/reset. Then, the power-on diagnostics are run.

A power-on diagnostics module 402 performs tests on the various hardware blocks. The result of the diagnostics is stored in NVSRAM 318. If the tests are passed, the green "Health" LED will blink at a slow rate of 1 second on and 1 second off. A supervisory module 404 downloads the runtime code from flash memory 314 to local memory 306 and executes it. If the runtime code is not present in flash memory 314, the code is downloaded from the TFTP server. supervisory module 404 is a simple control loop with tasks executed in a round-robin fashion.

A TFTP module 406 is used for downloading the runtime code from a TFTP server and uploading the code to a server if needed. A UDP/IP stack 408 the protocol modules IP and UDP. A PPP module 410 implements the PPP protocol. A flash utilities 412 stores runtime code in flash memory 314 in compressed form, and contains all the functions related to flash memory 314 read/write routines and compression-decompression algorithms. A 100Base-T driver 414 and a 10Base-T driver 416 are each used during execution of Boot code for downloading the runtime file from the TFTP server, if required. Driver 414 controls the operation of sending Ethernet packets, receiving Ethernet packets and allocation and management of receive and transmit queues. A serial driver 416 is used during execution of Boot code for printing debug messages and also for downloading the runtime code during testing. The serial driver controls the operation of the serial interface chip. A debugger 418 comprises typical debugger functionality, and also includes a menu driven interface for local diagnostics. A configuration utility 420 allows the user to configure the DSL multiplexer 252. The user can access this utility through the serial port. System utilities 422 include a timer and memory buffer functions.

Initially, when the runtime code is launched, a modem pool module 502 connects a CO modem to each of the subscriber lines in turn. For each connection, the line parameters such as maximum upstream and downstream speeds, receiver equalizer coefficients, etc are retrieved from the modem and stored in a database in memory. This database will be used later to "reestablish" a connection. Modem-pool module 502 "scans" all unconnected lines, in rotation, using free modems (if no free modem exists, it will not scan). If more than one free modem are available, the scanning will be done on many lines in parallel. After connecting the CO modem to a particular line, the line parameters of that line will be stored to the CO modem and a local warm startup command (ATT_LCL_WARM_REQ) is given with a max time-out of 3 second. The CP modem 220 will detect this command and will respond to the warm startup and both CO modem and CP modem will come to the data mode. If the CP modem 220 has no data to transfer it will issue a local standby command (ATT_LCL_STBY_REQ) immediately. When the inactivity is detected by CP modem 220 at the Ethernet port (no data for more than TBD minutes, may be one minute) the CP modem 220 issues a local standby command. The CO modem in the DSL multiplexer 252 will detect this condition and will go to the standby mode and release the modem to the free pool.

A RADSL transceiver driver 504 controls the operation of the ADSL transceivers present on the card. RADSL transceiver driver 504 handles start-up of the CO modems, and setting up the parameters and reading status of the CO modems. An ADSL driver 506 controls the operation of RACs 308, 309 (GT-96010's) interfaced with transceivers 300. ADSL driver 506 sends and receives packets over the ADSL line using the HDLC-like framing mode. The parameters downstream baud rate, constellation, noise margin, transmit power level etc. are stored in the NVRAM 318.

100 Mbps Ethernet port driver 508 provides the up-link to the data network. 100 Mbps Ethernet port driver 508 controls the operation of sending Ethernet packets, receiving Ethernet packets and allocation of receive and transmit queues. This also handles the switching to the secondary link when the primary link fails.

A SNMP and MIBs module 512 implements the SNMPv2 protocol and thus provides management and statistics collection through both in-band and out-of-band SNMP links.

A UDP/IP stack are implemented in a UDP/IP module 516. Minimal routing functions are implemented in the IP layer, to allow various network management configurations. DSL multiplexer 252 will route SNMP packets destined for other DSL multiplexers 252 as follows: (a) packets received on the serial port will be sent either to the 10Base-T port or to the 100Base-T port depending on the routing table, (b) packets received on the 10Base-T port will be sent on the 100Base-T port. (response packets follow the reverse path.) Routing tables will be manually entered by the operator via the configuration utility; they will not be dynamically updated by the IP module.

10Base-T driver 518 controls the operation of the 10Base-T Ethernet interface. 10Base-T driver 518 performs the functions of: sending Ethernet packets, receiving Ethernet packets, and allocation and management of receive and transmit queues.

A PPP module 520 implements the point to point protocol (PPP) and interacts with a serial driver 522 which controls the operation of the serial interface chip.

A proprietary protocol handler 524 is used for sending/receiving proprietary protocol packets on the ADSL interface for managing CP modem 220.

The following parameters have to be passed from DSL multiplexer 252 to multimedia switch 260: presence of DSL multiplexer 252 on a Fast Ethernet port, current ADSL link speed on each one of the CP modems 220 connected to DSL multiplexer 252, MAC address of end station 210 connected to each CP modems 220.

DSL multiplexer 252 sends unsolicited Ethernet packets to multimedia switch 260 at regular intervals. At present the time interval between two successive packets is fixed, for example at 300 seconds. A MIB variable will be provided to configure this parameter. The interval is kept large enough so as not to consume any significant bandwidth on the 100Base-T link. Multimedia switch 260 can request DSL multiplexer 252 for any of the above parameters at any time. On receiving such a request, DSL multiplexer 252 responds with a packet containing the value of the requested parameter.

Figure 6:
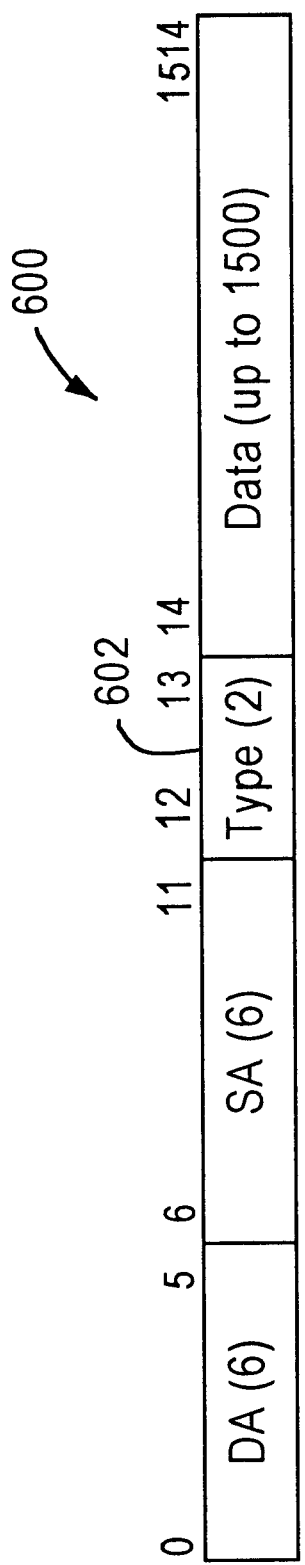
FIG. 6 is a block diagram of a standard Ethernet type 2 packet format.

FIG. 6 is a graphical representation of a standard Ethernet type II (DIX) packet format 600. A type field 602 in the Ethernet packet is a value greater than or equal to 0800h. This gives the SAP number of the protocol destined to receive this packet. Multimedia switch 260 and DSL multiplexer 252 use a proprietary type value of FFF0h for sending their protocol packets.

Figure 7:
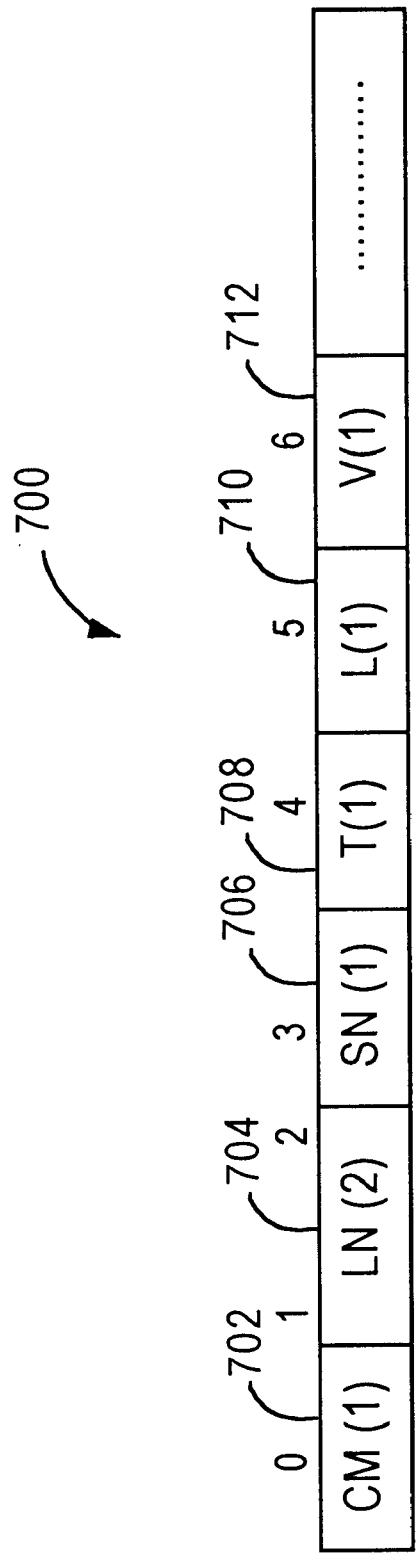
FIG. 7 is a block diagram of a data field of a proprietary protocol PDU.

A data field 700 of the protocol PDU is graphically represented in FIG. 7. A command field (CM) 702 comprises one byte, a total length (TL) field 704 comprise two bytes and includes the command field 702. A sequence number (SN) field 706 comprises one byte. A type (T) field 708, a length (L) field 710 and a value (V) field 712 are also provided.

The command field 702 can have the following values:

| | |
|---|---|
| 01h | Request parameter (REQ) |
| 02h | Report Parameter (REP) |
| 03h | Unsolicited parameter update (UPU) |
| 04h | Keep-alive (KA) |
| 0ffh | Acknowledgement (ACK) |

More enumerations will be added as and when necessary.

The values of command field 702 are used in a protocol administered between DSL multiplexer 252 and multimedia switch 260. After start up and initialization, DSL multiplexer 252 starts sending keep-alive (KA) packets on its 100Base-T port 302 once in 5 minutes. This packet will have CM=4, LN=4 and no TLV fields 708, 710, 712. SN field 706 will start from 0 and gets incremented for every subsequent packet. This field wraps around to 0 after ff.

If multimedia switch 260 receives this packet, it sends an acknowledgement (ACK) packet to DSL multiplexer 252. This packet will have CM=ff, LN=5, SN same as the value in the received KA packet and no TLV fields. One byte, immediately after the SN field 706 contains the value of CM field 702 that was in the received KA packet.

To start with, DSL multiplexer 252 initializes its 5800_discovered flag to FALSE. When DSL multiplexer 252 gets an ACK for the keep-alive packet, it sets 5800-discovered flag to TRUE. Further on, if it does not get an ACK packet for 2 successive KA packets, it resets 5800-discovered flag to FALSE. However, DSL multiplexer 252 will continue to send KA packets.

Multimedia switch 260 initializes its per-port 5300_discovered flag to FALSE. If multimedia switch 260 receives a KA packet on a port, the 5300_discovered flag for that port is set to TRUE. Further on, if multimedia switch 260 does not receive a KA packet on a port for 2 minutes, the 5300_discovered flag for that port is set to FALSE.

If the 5800_discovered flag is TRUE, DSL multiplexer 252 sends an unsolicited parameter update (UPU) packet when it detects any change in the exchanged configuration parameters. The UPU packet will also be sent with all the parameters when the 5800_discovered flag changes from FALSE to TRUE.

The UPU packet contains variable number of the following TLV fields: (a) a MAC address having a type field of one byte, a length field of eight bytes, a value field of six bytes of DSL multiplexer MAC address; (b) link speed having a type field of two bytes, a length field of five bytes, and a values field of 3 bytes—1 SL number, 2 link speed upstream, 3 link speed downstream; and (c) a port MAC address having a type field of three bytes, a length field of nine bytes, and a value field of seven bytes. The seven bytes of the value field correspond to SL number (1) and MAC address (2–7). When multimedia switch 260 receives a UPU packet, it updates its database with the information contained in the packet. Then it sends an ACK packet for the UPU packet.

Multimedia switch 260 can any time send a Request Parameter (REQ) packet to DSL multiplexer 252 on one of its ports. This packet will have the following format:

| | |
|---|---|
| CM | 01h |
| T | Type of the requested parameter |
| L | 03h |
| V | SL number |

DSL multiplexer 252 can request multiple parameters in a single PDU.

When DSL multiplexer 252 gets a REQ packet from multimedia switch 260, it fills the values of all requested parameters in the REQ PDU and sends a Report Parameter (REP) PDU to multimedia switch 260. The REP PDU fields are given below:

| | |
|---|---|
| CM | 02h |
| SN | Same as in the REQ PDU |
| T | Type of the parameter |
| L | Length of the TLV field |
| V | SL number and value. |

Figure 8:
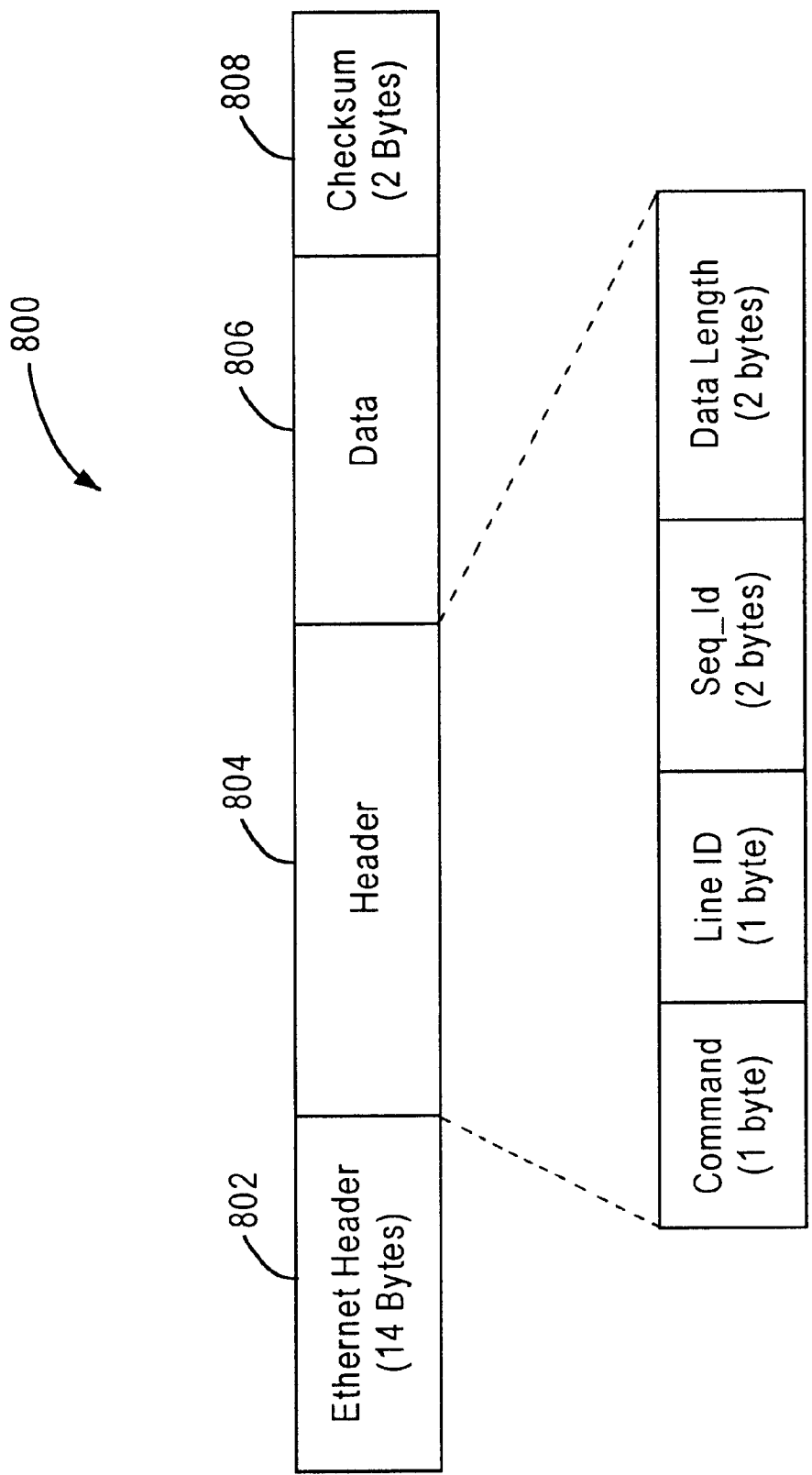
FIG. 8 is a block diagram of a generic PDU format for exchanging information in accordance with the present invention.

FIG. 8 illustrates a generic PDU format 800 for exchanging proprietary protocol between modem 220 and DSL multiplexer 252. Generic PDU format 800 includes an Ethernet header 802, a DSL multiplexer header 804, data field 806, and two bytes of check sum 808. An Ethernet header 802 comprises a source MAC which contains a 10BaseT MAC address of CP Modem 220 when a PDU is originating from the modem 220. When the PDU originates from the CO DSL multiplexer 252, this field contains its 10BaseT/100BaseT Ethernet Port's MAC address.

Ethernet header 802 also includes a destination MAC which contains a broadcast MAC address irrespective of whether the packet is originating from modem 220 or CO DSL multiplexer 252. Ethernet header 802 has a type/length which should contain 0 to uniquely differentiate between a Standard Ethernet packet and a DSL multiplexer 252 packet on the ADSL link. Standard Ethernet Packets will have a non-zero value for this field which signifies that the packet format is either DIX or IEEE.

The DSL multiplexer 252 can be managed through the console port, 10Base-T port or 100Base-T port. The DSL multiplexer 252 will provide SNMP proxy functionality for allowing management of the CP modems connected to it. A proprietary protocol will be used between the CP & DSL multiplexer 252 to transact management information between them. This protocol will be transparent to the NMS. The DSL multiplexer 252 maintains the latest management information from all the CPs connected to it. This information will be obtained by the DSL multiplexer 252 through periodic polling of the CP modems 220 which are currently on-line. The DSL multiplexer 252 routes the management traffic among the following 3 ports: 10Base-T, 100Base-T and Console Port. Hence, each of these ports has to be allocated an IP address (belonging to different subnets). This will enable an NMS present on any of these 3 subnets to manage other DSL multiplexer 252s within the Telco. The DSL multiplexer 252 will use statically configured routing table entries for routing.

Figure 9:
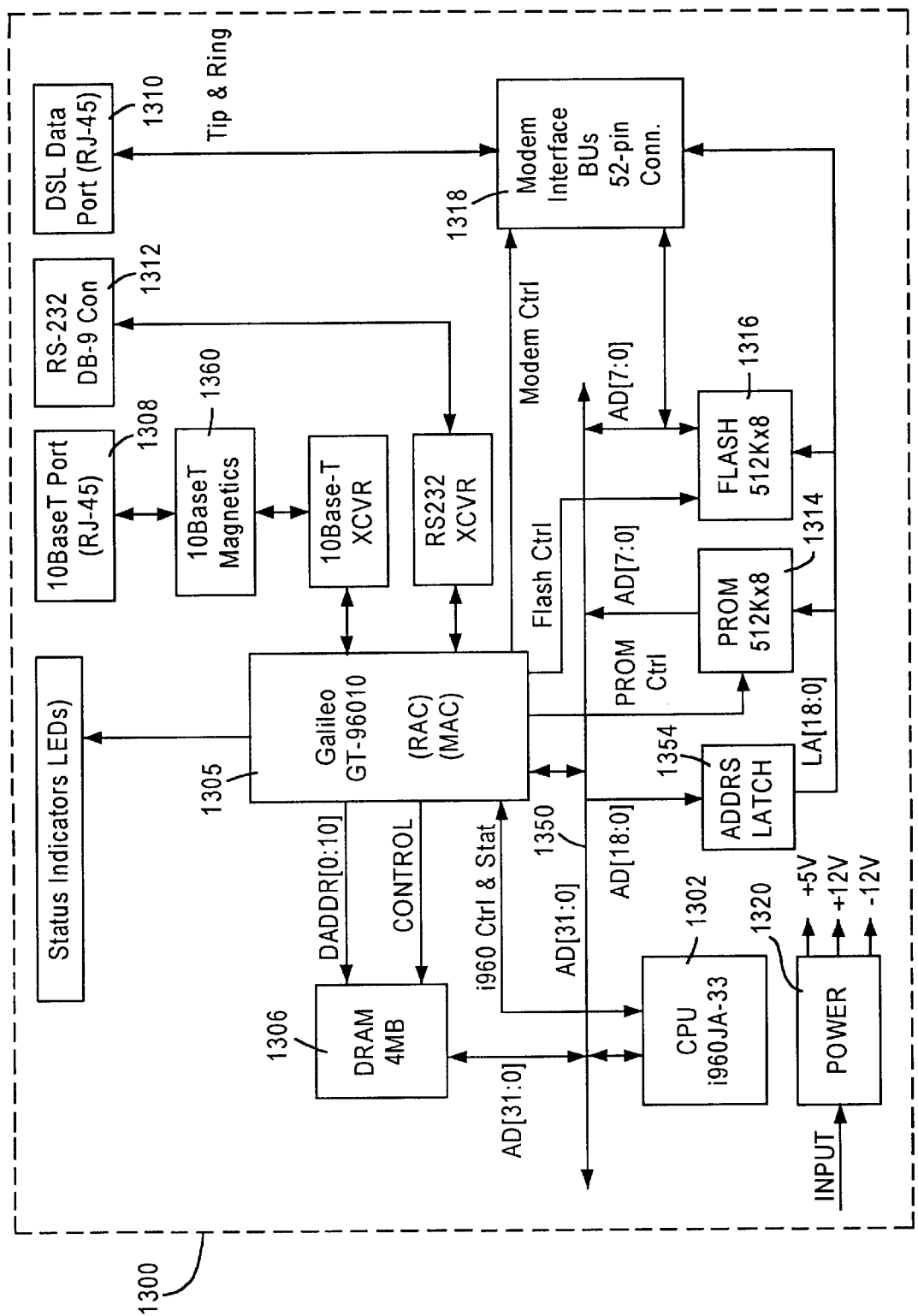
FIG. 9 is a functional block diagram depicting components of a processing card of an embodiment of the present invention.
Figure 10:
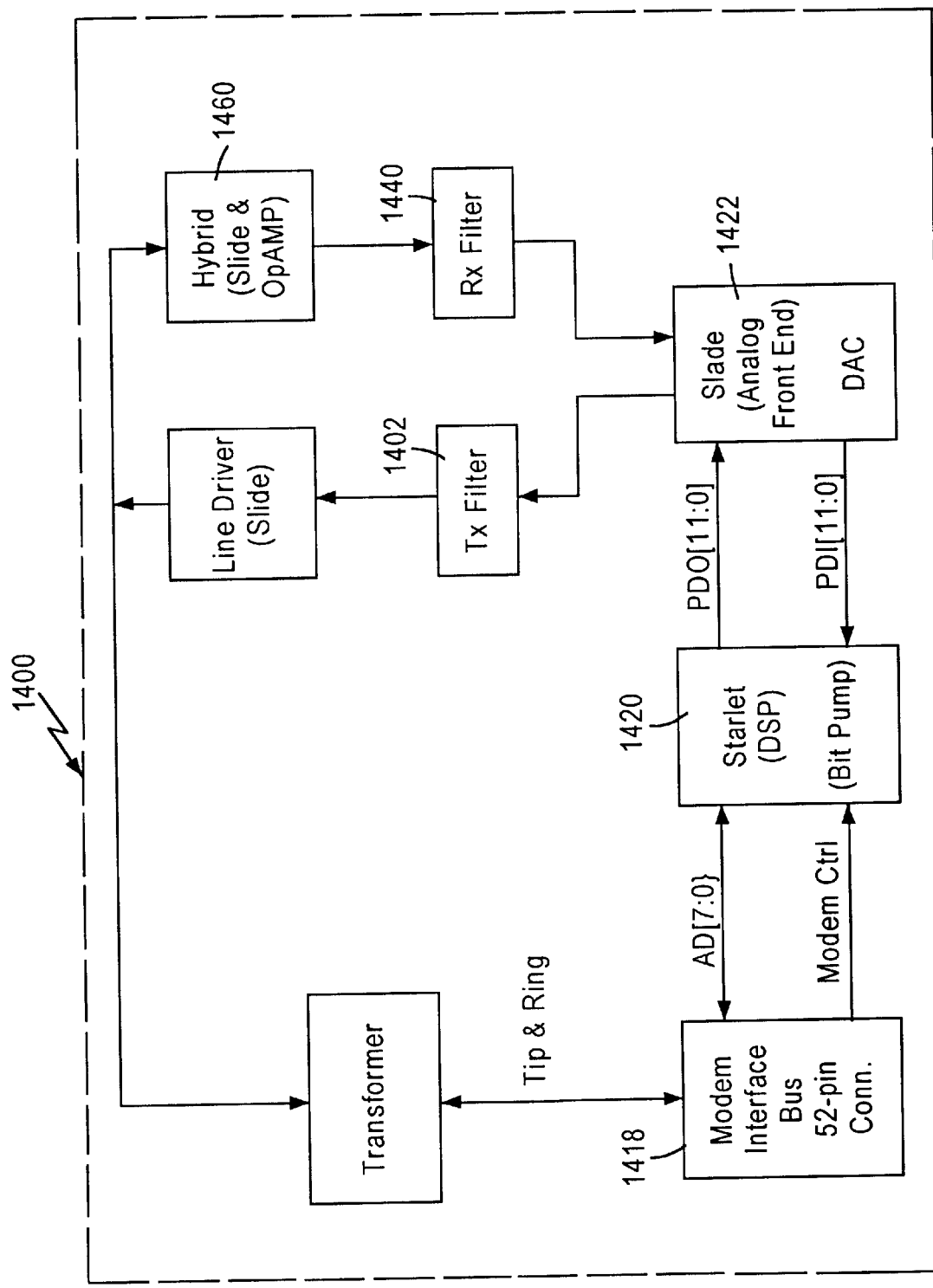
FIG. 10 is a block diagram depicting components of a modem card of an embodiment of the present invention.
Figure 11:
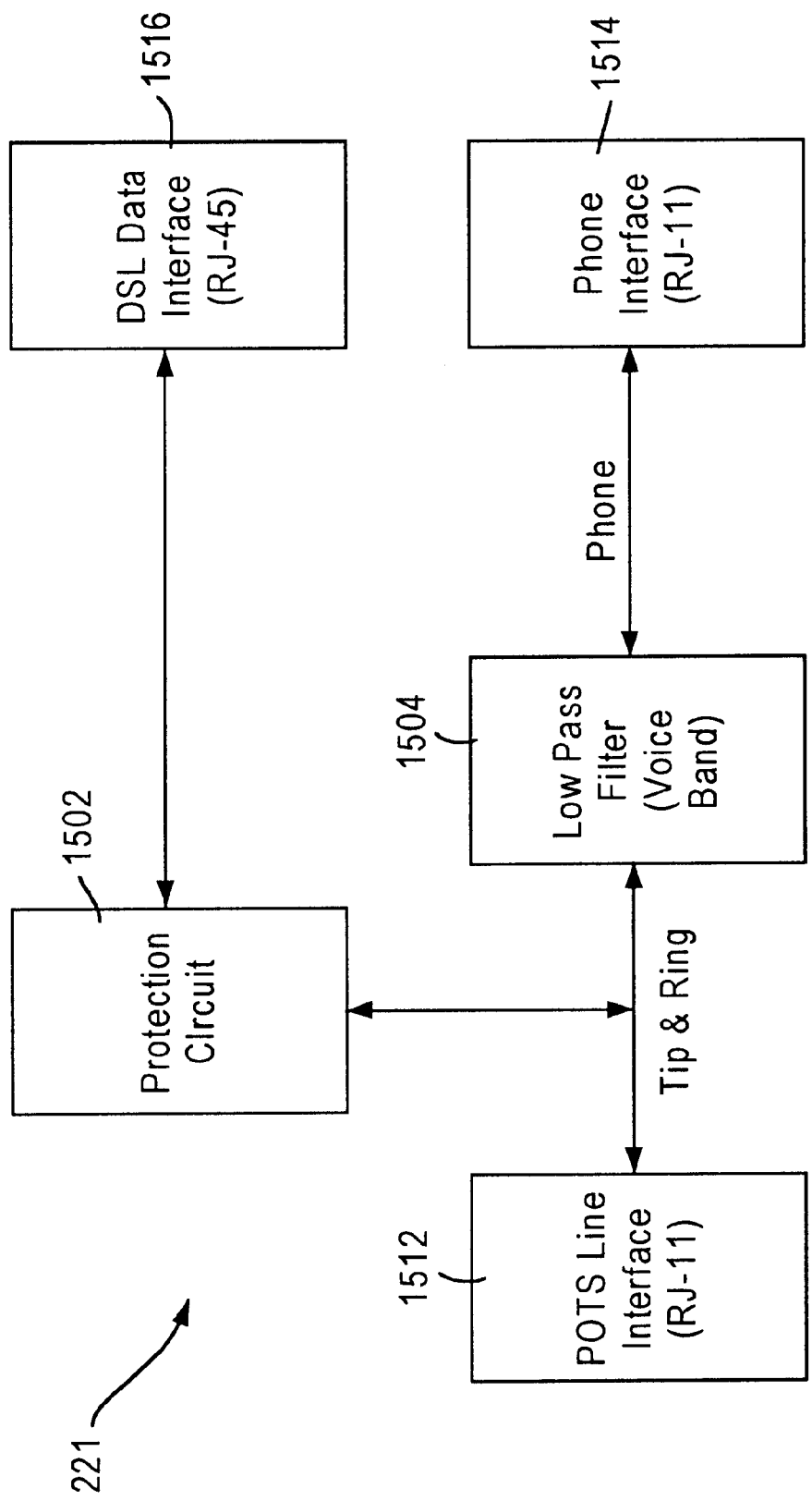
FIG. 11 is a block diagram of components of a customer premise POTS splitter of an embodiment of the present invention.

FIGS. 9–11 show block diagrams illustrating various components of a customer premise (CP) DSL modem 220 (FIG. 2A). DSL modem 220 can be implemented as a RADSL modem for example, and thus utilizes a two card solution comprising a base CPU card 1300 (FIG. 9) and a daughter modem card 1400 (FIG. 10).

The CPU card 1300 is based on, for example, an Intel i960JA, 32-bit processor 1302 running at 33 Mhz and a Remote Access Controller (RAC) 1305 (e.g., GT96010 from Galileo Technologies Inc). RAC 1305 provides a glue-less interface between CPU 1302 and the rest of the peripherals. It functions as the DRAM controller for a common 4 MB EDO (Extended Data Out) DRAM 1306 based memory bank which serves as both the packet buffer for data and runtime code memory. RAC 1305 implements an Ethernet (10BaseT) LAN port 1308, a HDLC (High level Data Link Control) port to interface to the RADSL modem transceiver (WAN port) 1310 and an optional RS232 serial console port 1312 for debug purposes. RAC 1305 also provides address decoding for peripherals like a PROM 1314, FLASH 1316 and a modem transceiver chipset (modem card) 1400. Boot code is stored in PROM 1314 while the runtime code along with runtime configuration is held in FLASH 1316. This allows easy field upgrades of the firmware. An 8-bit Modem Interface bus 1318 provides the interface for the modem card 1400. Power for both CPU 1300 and modem card 1400 is supplied by an external DC power supply 1320. Modem card 1400 implements the RADSL transceiver functionality using, for example, the Globespan's RADSL chipset along with a receive filter 1402 and a transmit filter 1404 and hybrid 1406. A line protection circuit 1502 and a low pass filter 1504 (for the CP POTS) are implemented in the POTS splitter module 221. This allows modem 220 to be country independent.

In returning to FIG. 9, CPU card 1300 is shown as comprising CPU 1302 which can be implemented for example as i960JA operating at a 33 MHz system clock. A 32-bit multiplexed address/data (AD[31:0]) bus 1350 and interfaces directly to the Galileo GT-96010 RAC chip for peripheral interface support. An address latch 1352 generates the de-multiplexed addresses for PROM 1314 and Flash memory 1316. CPU card 1300 uses the CPU generated ALE (Automatic Link Establishment) as a strobe to generate a 119-bit latched address LA[18:0] from an address latch 1354 to address a 1512 KB space. PROM 1314 a 1512 KB OTPROM implemented with an AM27C040, for example. PROM 1314 holds the boot code and is accessed by CPU 1302 as an 8-bit, read-only device capable of burst accesses.

Flash memory 1316 is a 512KB 5V programmable flash memory 1316 implemented with an AM29F040, for example. Flash memory 1316 holds the runtime firmware and user configurable parameters, and is accessed by CPU 1302 as an, 8-bit, read/write device capable of burst accesses.

RAC 1305 is a multi-function controller that interfaces CPU 1302 to the on-board peripherals (OTPROM & FLASH) and the Modem Interface Bus. RAC 1305 also controls DRAM 1306 and acts as a watchdog timer. RAC 1305 indicates status and detects read/write ports and also performs Ethernet media access control (MAC). RAC 1305 provides a HDLC port for serial interface to modem card 1400, and also providing a serial console port for debugging.

DRAM 1306 comprises of 4 MB of EDO DRAM, and is implemented as a 32-bit wide memory block controlled by a DRAM controller in RAC 1305. RS-232 transceiver block 312 is a 5V which drives the null-modem configured debug console port.

10BaseT-port 1308 is a block that provides the half-duplex physical layer interface to the Ethernet controller within RAC 1305. It also implements a physical layer loop-back after the Manchester ENDEC for diagnostics. 10BaseT Magnetics 1360 provides the isolated 10Base-T interface to the twisted pair media.

Modem interface bus 1318 is a bus that provides the interface to modem card 1400. It provides the following: 8 bit Data Bus (AD [7:0]); 3 bit non-multiplexed address bus; read/write control signals; HDLC based serial data-path to & from the RADSL bit-pump; DSL at a media interface—Tip & Ring lines; and DC Power-supplies—+12V, −12V & 15V.

FIG. 10 shows modem card 1400 which implements the RADSL modem transceiver based on, for example, the Globespan's RADSL chipset. The card 1400 has a modem interface bus 1418 which provides the interface to the base CPU card 1400. A DSP block 1420 is the RADSL bit pump, and is based on for example the Starlet (later STAR) chip from Globespan. DSP block 1420 handles the digital signal processing functions, runs firmware provided by Globespan and is controlled by CPU 1302.

An analog front end (DAC) 1422 is the A-to-D & D-to-A block implemented for example by the Globespan's SLADE chip. DAC 1422 receives digital data from bit pump 1420, and converts it to an analog signal for transmission on the DSL Data line. On the receive side, DAC 1422 digitizes the incoming analog data and feeds it to the bit pump 1420 for further processing. Tx filter 1402 is a $4^{th}$ order Chebyshev low-pass filter with a cut-off of 1194 kHz. Rx filter 1404 is a $7^{th}$ order Elliptical high-pass filter with a cut-off of 1240 kHz. A line driver is based on the Elantec "Slide" chip, for example, and drives transmit data onto the DSL data line. Receive hybrid 1406 separates the incoming receive data from the transmit data. Isolation transformer 1430 isolates the on-board electronics from the two-wire (POTS line) DSL data interface.

Turning now to FIG. 11, POTS splitter 221 is shown as an external self-contained module implements line protection circuitry 1502, low-pass filtered voice channel interface 1504. POTS splitter 221 provides interface ports to an RJ-11 POTS line interface 1512, a RJ-11 phone interface 1514, and an RJ-45 DSL data interface 1516.

Figure 12:
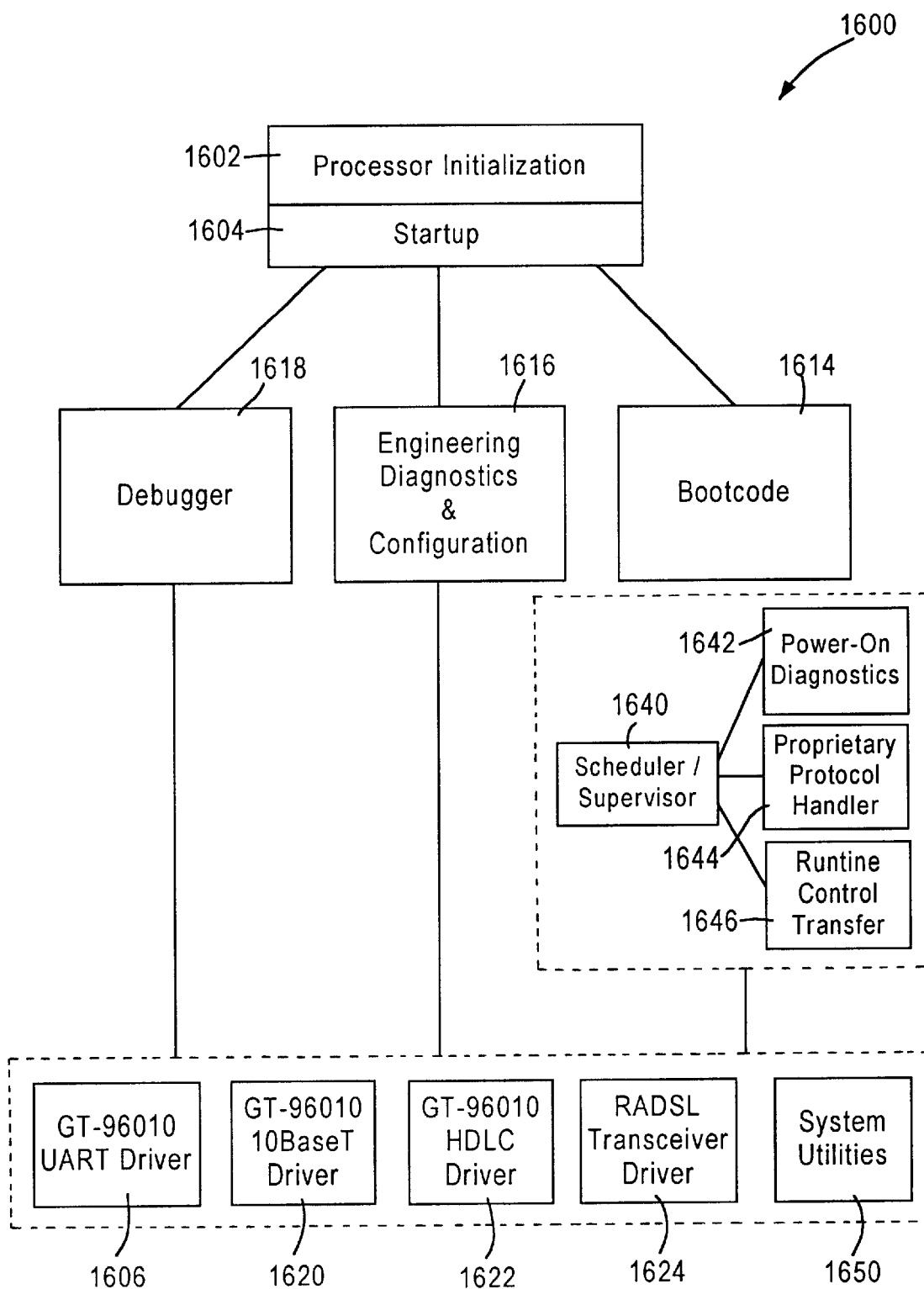
FIG. 12 is a functional block diagram of PROM code architecture of an embodiment of the present invention.
Figure 13:
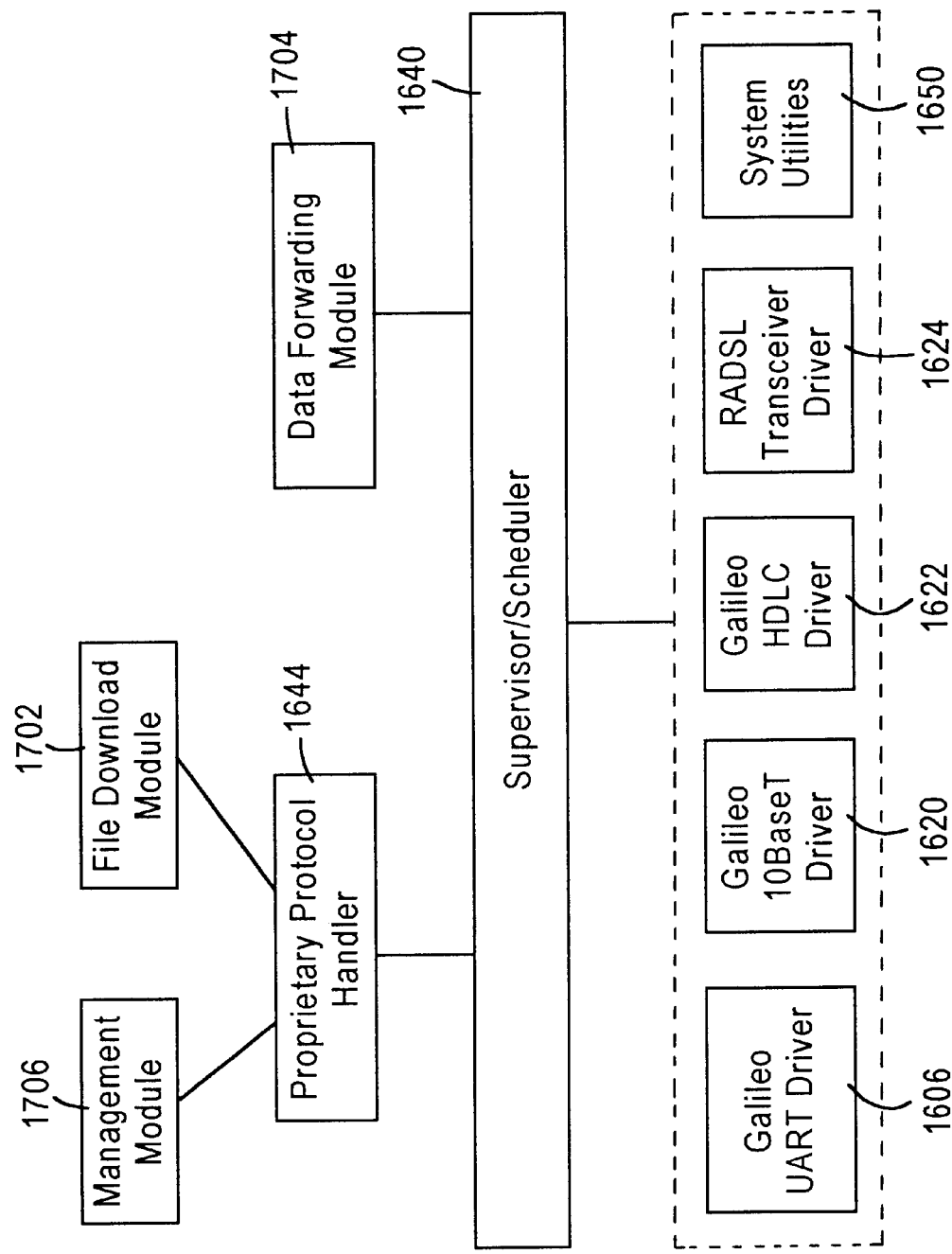
FIG. 13 is a functional block diagram of runtime code architecture of an embodiment of the present invention.

FIGS. 12 and 13 illustrate various software modules that are included in modem 220. The software in CP modem 220 comprises a PROM code 1600 and Runtime code 1700 in FIGS. 12 and 13, respectively. PROM code 1600 resides in the OTPROM 1314 and gets control after reset. Runtime code 1700 gets control from the boot code. The Runtime code 1700 resides and executes from DRAM 306.

Turning now to FIG. 12, PROM code architecture includes a processor initialization module 1602 which gets control on power-on/reset of the hardware shown in FIGS. 9–11. Processor initialization module 1602 initializes RAC 1305 and RADSL transceiver chipsets 1400, copies CPU 1302 control structures from PROM 1314 to DRAM 1306, initializes registers and restarts the processor to point to the control tables in DRAM 1306. Processor initialization module 1602 then passes the control to a startup module 1604.

Startup module 1604 initializes a Galileo Serial UART Interface 1606 (for example) and displays a menu on the console port. The user can select entry to either bootcode 1614 or engineering diagnostics 1616 or a debugger 1618 by pressing appropriate keys. If no key-press is detected, then startup module 1604 defaults to Bootcode 1614.

Debugger 1618 module provides the entry point for the Mon960 based debug monitor. The debug monitor consists of typical debugger functionality such as memory edits, memory displays, code downloads and code executions.

Engineering diagnostics module 1616 can be used for engineering diagnostics and for configuring the CP Modem 220.The engineering diagnostics can be used for diagnosing various hardware components. For example, tests can be performed on GT-96010 Ethernet port using driver 1620, GT-96010 HDLC port using driver 1622, RADSL Transceiver Chipsets using driver 1624, Timer, OTPROM 1314, Flash 1316 and DRAM 1306.

Bootcode 1614 uses a scheduler/supervisor 1640: Initializations of Hardware & Software data-structures; Power-On Diagnostics 1642; Runtime File transfer from TELCO through CO DSLAM, using a proprietary protocol 1644; and Transfer of control to a runtime code 1646.

The supervisor/scheduler module 1640 comprises an initialization module and a round-robin scheduler. The initialization module performs initializations of hardware components and software data-structures. The round-robin scheduler schedules and executes various tasks based on their necessity. This module can schedule activities for: runtime file download from TELCO via CO DSLAM 252 and transfer of control to runtime code.

Proprietary protocol handler 1644 is used for sending/receiving proprietary protocol packets on the ADSL interface. The only proprietary protocol packets that can be sent/received on the ADSL interface, in Bootcode 1614, are the packets related to a file download process through CO DSLAM 252. This protocol is used exclusively for CO-CP communication and is active only after a connection to the CO has been established successfully.

FIG. 13 shows file download module 1702 is used for getting the Runtime file from a TFTP server present in the TELCO domain. The file is downloaded to the CP 1200 by the CO-DSLAM 252 using a proprietary protocol through CO DSLAM 252. The file will be compressed and stored into flash 1316 as it is being downloaded. After the file is completely downloaded, compressed and stored in the flash 1316, scheduler/supervisor 1640 activates the decompression routine, which will decompress the runtime code present in Flash 1316 into DRAM 1306. Scheduler/supervisor 1640 then transfers control to runtime code 1646 present in DRAM 1306. For subsequent power-ons, the compressed runtime file 1646 present in the flash 1316 will be decompressed and executed, thereby avoiding File Transfer Operations.

The Galileo 10Base-T driver 1620 is used to control operations of Initializing Ethernet channel, sending Ethernet packets, receiving Ethernet packets and allocation of receive and transmit buffers. The Galileo HDLC driver 1622 is used to control operations of initializing a Galileo MPSC channel for HDLC protocol, sending HDLC packets, receiving HDLC packets and allocation of receive and transmit buffers.

The RADSL Transceiver Driver 1624 is used to control operations related to modem card 1400. The driver handles sending and receiving of data, setting of the parameters for the transceiver and reading the status of the transceiver line. The software driver that is being used is supplied by GlobeSpan Technologies. This driver 1624 consists of Source files, which are compiled and linked with CP Modem application.

The Galileo UART Driver 1606 is used to control operations of initializing a Galileo MPSC channel for UART protocol, sending characters, receiving characters and allocation of receive and transmit buffers. The serial port is used for the following purposes: as an Interface for the Debugger; as an interface for the Engineering Diagnostics and CP Modem configurations; and for Console based debug tracing. A system utilities module 1650 comprises utilities such as timer, memory manager, file-compression and file-decompression utilities.

The runtime code architecture is shown in FIG. 13. A data forwarding module 1704 is responsible for forwarding data between Ethernet and ADSL interfaces. Data received on Ethernet will be forwarded on the ADSL; and data received on the ADSL will be forwarded on the Ethernet.

A management module 1706 is used for the management of the CP Modem through the CO DSLAM 252. The CP modem 220 maintains management information, which can be queried through a CO DSLAM 252 from an NMS, on the TELCO domain. A proprietary protocol is used between CP modem 220 and CO DSLAM 252 for exchanging the management information and is active only after a connection to the CO has been established successfully.

File download module 1702 is used for upgrading the runtime file from TELCO. The file is downloaded using a proprietary protocol through CO DSLAM 252. The file will be compressed and stored into the Flash 1316 as it is being downloaded. The CP modem 220 should be power-cycled for this new firmware to take effect.

The Ethernet switch 260 as detailed above works in conjunction with the end-user-workstation's software to quickly deliver multimedia information while ensuring an end-to-end negotiated quality of service that is free from delay inducing congestion. The end-station executes a shim software. The shim comprises a protocol combination, or other suitable combination of protocols, to allow the implementation of CIF technology to bring native ATM services to desktops that are equipped with legacy Ethernet or Token Ring NICs by encapsulating cells into frames. CIF can also be viewed as the inverse of ATM LAN Emulation (LANE). LANE provides a way for legacy LAN media access controller-layer protocols like Ethernet and Token Ring, and all higher-layer protocols and applications, to access work transparently across an ATM network. LANE retains all Ethernet and Token Ring drivers and adapters; no modifications need to be made to Ethernet or Token Ring end stations. In other words, CIF emulates ATM services over frame-based LANs. CIF uses software at the workstation without requiring the procurement of a new NIC to support quality of service scheduling and ABR/ER flow control.

To achieve end-to-end quality of service, the shim resides as a layer in end station to provide encapsulation of cells within Ethernet frames in the desktop for transport to the data network. Shim supports multiple queues, a scheduler (not shown), the ER flow control, and header adjustment. Shim comprises an ATM Adaptation Layer (AAL) which is the standards layer that allows multiple applications to have data converted to and from the ATM cell. AAL is protocol used that translates higher layer services into the size and format of an ATM cell. The CIF shim layer also includes a traffic management (TM) component that sets forth the congestion control requirements. The TM component (not shown) can be implemented as TM 4.0. The ATM Forum has developed a complete 4.0 protocol suite that includes UNI signaling 4.0 which allows signaling of bandwidth and delay requirements for QoS; whereby, TM 4.0 which specifies explicit rate flow control and QoS functions.

CIF shim layer also includes a frame segmentation and reassembly (SAR) sublayer (not shown) which converts protocol data units (PDUs) into appropriate lengths and formats them to fit the payload of an ATM cell. At the destination end station, SAR extracts the payloads for the cells and converts them back into PDUs which can be used by applications higher up the protocol stack. The shim adds the CIF header to packets before they are transmitted, and removes the header when they are received. The shim manages the message queues by queuing outgoing data into multiple queues for QoS management. Shim also processes the RM cells for explicit rate flow control using the ABR flow control and allows ATM signaling software to run both native ATM application as well as standard IP applications.

End station further comprises a device driver and a Network Device Interface Specification (NDIS) layer located above the CIF shim layer. The end station includes Internet Protocol (IP) layer which supports classical IP, LANE and MPOA for the interworking of dissimilar computers across a network. IP layer is a connectionless protocol that operates at the network layer (layer 3) of the OSI model. Winsock 2.0 is the application program interface (API) layer, which enables developers. to take advantage of ATM's QoS and traffic management features. Application layer can accommodate traditional as well as native ATM applications. Native ATM applications can be readily created with Winsock 2.0 API.

The shim arrangement guarantees that the services negotiated by the native ATM applications for the VCs are not arbitrarily disrupted by the traffic generated by the legacy applications. Forcing both the ATM and the legacy protocol traffic to go through CIF shim allows CIF shim to manage the transmission of all traffic according to the QoS specified for each traffic stream. To support the migration of legacy applications, the CIF AD forwards CIF traffic from the conventional LAN onto the ATM infrastructure for delivery to an ATM attached end station or to another CIF AD. The CIF ES is also required to run LANE, MPOA (Multiprotocol Over ATM), or Classical IP protocols. Network data from a legacy application is first handled by the legacy protocols (e.g., TCP/IP), and then turned into ATM traffic by LANE, MPOA, or Classical IP. The CIF ES function encapsulates the individual cells into CIF frames before data is finally transmitted on the wire to the CIF AD.

The enhancements in the network as discussed above can be implemented if the end-user is shielded from any bottlenecks that will negate such enhancements; the bottleneck typically exists at the access link. Thus, the method of access needs to be made fast and reliable; this is provided through the use of a DSL modem terminating at a corresponding DSL multiplexer over a copper twisted pair infrastructure.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. An access device for providing high speed network connectivity, comprising:
   a main processor for executing code to send and receive proprietary protocol packets for communicating management information with a multiplexer using a digital subscriber line (DSL) technology, the management information indicating presence of an Ethernet-type port, current line speed, and media access control (MAC) address;
   a modem interface bus coupled to the main processor for providing read/write control signs;
   a multi-function controller coupled to the main processor for performing Ethernet media access control (MAC);
   an Ethernet interface coupled to the multifunction controller for communicating with an external Ethernet device;
   a DSL port coupled to the modem interface bus for receiving and transmitting a DSL signals;
   a DSL bit pump coupled to the modem interface for performing digital signal processing functions; and
   a digital/analog converter (DAC) coupled to the DSL bit pump for outputting signals to the DSL bit pump for transport over the DSL port and over the Ethernet interface.

2. The access device as in claim 1, wherein the proprietary protocol packets comprises:
   a line identification field that identifies a subscriber line associated with one of the subscriber DSL modems;
   a sequence identification field that is used for synchronization between the data frames;
   a data length field that specifies the length of a data payload within the data frames; and
   a checksum field for error detection.

3. The access device as in claim 1, further wherein the DSL technology is a rate adaptive DSL (RADSL).

4. The access device as in claim 1, further comprising:
   a DSL data interface for receiving and transmitting the DSL signals to and from the DSL port;
   a plain old telephone service (POTS) line interface coupled to the DSL data interface port for communicating with a public switched telephone network via a POTS signal having a voice band and a data band; and
   a low pass filter coupled to the POTS line interface for separating the voice band and the data band.

5. The access device as in claim 2, wherein the DSL port comprises a RJ-45 connector.

6. The access device as in claim 1, wherein the management information comprises lower and upper Service Access Point (SAP) information.

7. The access device as in claim 1, wherein the management information comprises a file download module for retrieving a runtime file from the multiplexer.

8. An access device for providing high speed network connectivity, comprising:
   a central processing unit (CPU) card comprising:
      (a) a main processor configured for supplying management information with a multiplexer over a digital subscriber line (DSL), the management information indicating presence of an Ethernet-type port, current line speed, and media access control (MAC) address;
      (b) a multi-function controller coupled to the main processor for configured for performing Ethernet media access control (MAC);
      (c) a modem interface bus coupled to the main processor configured for providing read/write control signs;
      (d) a DSL port coupled to the modem interface bus for receiving and transmitting a DSL signals; and
   a modem card coupled to the CPU card for interfacing a public switched telephone network (PSTN) comprising:
      (a) a DSL bit pump coupled to the modem interface of the CPU card configured for performing digital signal processing functions;
      (b) a digital/analog converter (DAC) coupled to the DSL bit pump for outputting signals to the DSL bit pump for transport over the DSL port and over the Ethernet interface.

9. The access device as in claim 8, further comprising a POTS splitter configured for combining and separating a voice band and a data band associated with signals received from the PSTN.

10. The access device as in claim 8, wherein the management information comprises lower and upper Service Access Point (SAP) information.

11. The access device as in claim 8, wherein the management information comprises a file download module for retrieving a runtime file from the multiplexer.

12. The access device as in claim 8, further comprising:
   a DSL data interface for receiving and transmitting the DSL signals to and from the DSL port;
   a plain old telephone service (POTS) line interface coupled to the DSL data interface port for communicating with a public switched telephone network via a POTS signal having a voice band and a data band; and
   a low pass filter coupled to the POTS line interface for separating the voice band and the data band.

13. The access device as in claim 12, wherein the DSL port comprises a RJ-45 connector.

* * * * *